US010904552B2

(12) United States Patent
Guermazi et al.

(10) Patent No.: US 10,904,552 B2
(45) Date of Patent: Jan. 26, 2021

(54) PARTITIONING AND CODING MODE SELECTION FOR VIDEO ENCODING

(71) Applicant: Intel Corporation, Santa Clara, CA (US)

(72) Inventors: Hassen Guermazi, Vancouver (CA); Nader Mahdi, Vancouver (CA); Chekib Nouira, Vancouver (CA); Omar Khlif, Richmond (CA); Faouzi Kossentini, Vancouver (CA); Foued Ben Amara, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/898,022

(22) Filed: Feb. 15, 2018

(65) Prior Publication Data

US 2019/0045210 A1 Feb. 7, 2019

(51) Int. Cl.

| | |
|---|---|
| ***H04N 19/51*** | (2014.01) |
| ***H04N 19/46*** | (2014.01) |
| ***H04N 19/159*** | (2014.01) |
| ***H04N 19/176*** | (2014.01) |
| ***H04N 19/103*** | (2014.01) |
| ***H04N 19/146*** | (2014.01) |

(52) U.S. Cl.

CPC ........... *H04N 19/51* (2014.11); *H04N 19/103* (2014.11); *H04N 19/146* (2014.11); *H04N 19/159* (2014.11); *H04N 19/176* (2014.11); *H04N 19/46* (2014.11)

(58) Field of Classification Search

CPC ...... H04N 19/51; H04N 19/46; H04N 19/159; H04N 19/176

USPC .................................................... 375/240.12

See application file for complete search history.

(56) References Cited

U.S. PATENT DOCUMENTS

2013/0016787 A1* 1/2013 Kim .................... H04N 19/176 375/240.16

2013/0077696 A1* 3/2013 Zhou .................. H04N 19/476 375/240.24

* cited by examiner

*Primary Examiner* — On S Mung

(74) *Attorney, Agent, or Firm* — Green, Howard & Mughal LLP.

(57) ABSTRACT

Techniques related to video encoding are discussed that, for each block of input video, select an individual partitioning and coding mode selection technique from multiple such selection techniques. For a picture, the selection algorithm takes as input scores for individual blocks, costs of the various partitioning and coding mode selection techniques, and various detector outputs. The selection algorithm provides as output a partitioning and coding mode selection technique for each block in picture. The algorithms selection is such that the overall cost of the selected algorithms in the picture is as close as possible to a given picture budget. Furthermore, a partitioning and coding mode selection algorithms, binary depth partitioning (BDP), is discussed. For a block, BDP provides fast convergence to a partitioning and associated coding modes first evaluating intermediate partitioning options and converging on the final partitioning by evaluating either larger of smaller partitions.

25 Claims, 10 Drawing Sheets

PARTITIONING AND CODING MODE SELECTION FOR VIDEO ENCODING

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable. Furthermore, encoding speed and efficiency are important aspects of video encoding.

It may be advantageous to improve video encoding speed and compression rate while maintaining or even improving video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
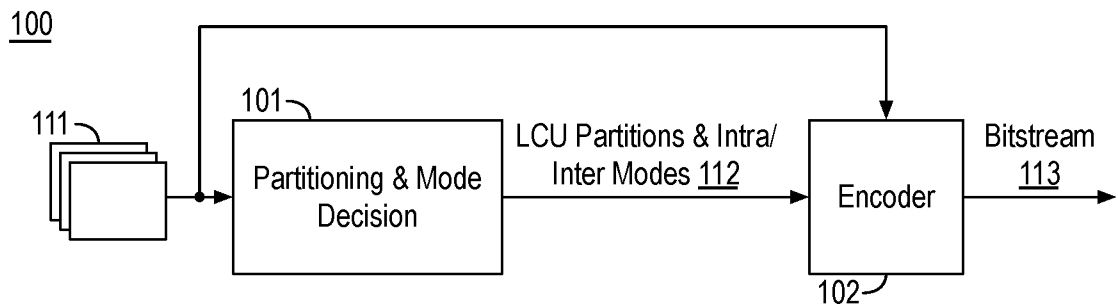
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to selection of partitioning and coding mode decision algorithms for coding blocks.

Techniques discussed herein provide for partitioning and coding mode selection for blocks in, for example, decoupled prediction and video coding contexts. In decoupled prediction and video coding contexts, motion estimation, intra mode evaluation, and mode decision (i.e., partitioning decision and prediction mode decision) are made using only source pixels or samples without use of reconstruction of samples using a (standards compliant) local decode loop. For example, a partitioning and coding mode decision module may generate final prediction data (i.e., final partitioning, final motion vectors, final INTRA modes) without use of any of the data generated by a standards compliant encoder with a compliant decode loop. Subsequent to the generation of such final prediction data, an encoder such as a standards compliant encoder with compliant local decode loop employs such final prediction data (e.g., decisions) to generate a standards compliant bitstream. That is, the final prediction data and decisions is generated independently and then transferred to a standards compliant encoder, where prediction-error information (i.e., residual data and corresponding transform coefficients) are generated in a compliant manner. For example, by using only input source pictures (e.g., source samples) to generate final prediction data including partitioning/mode decisions and related data such as motion vectors, a decoupling of mode decisions from standards compliant encoding may allow each of the two processes to run on independent hardware device, which improves parallelism in the encoding process, which, in turn, increases encode speed and reduces latency and memory requirements of the encoder. As used herein, the term sample or pixel sample may be any suitable pixel value. The term original pixel sample is used to indicate samples or values from input video and to contrast with reconstructed pixel samples, which are not original pixel samples but are instead reconstructed after encode and decode operations.

Partitioning and coding mode decision algorithms or techniques discussed herein include a largest coding unit (LCU)-based partitioning and coding mode decision approach for coding mode decision to identify the best partition for each LCU and corresponding coding modes. Such techniques maintain low computational cost and minimize visual coding artifacts. Such techniques may include an LCU-based switching mechanism that selects, on an LCU-by-LCU bases among multiple partitioning and coding mode decision techniques based on characteristics of the LCU, the picture the LCU is in, etc. The multiple partitioning and coding mode decision techniques may include any number of techniques as discussed herein. The multiple partitioning and coding mode decision techniques may include a constrained exhaustive search (e.g., for high-risk LCUs) partitioning and coding mode decision technique, a binary depth partitioning (BDP) (e.g., for medium-risk LCUs) partitioning and coding mode decision technique, an open-loop prediction and refinement (e.g., for low-risk LCUs) partitioning and coding mode decision technique, and others.

As discussed further herein, partitioning and coding mode decision may, on an LCU-by-LCU basis vary between selection techniques such that an exhaustive or constrained exhaustive technique may including testing all CUs in the set of 85 CUs (e.g., partitions from 64×64 to 8×8 assuming square CUs) or a selected subset of these CUs to come up with the best possible partition and associated coding modes for the partitioned LCU. The exhaustive option may be computationally very expensive but may provide better average visual quality. Other options may provide tradeoffs between the computational cost and visual quality. The discussed techniques provide selection of a subset of LCU partitions and corresponding coding modes to evaluate such that reduction in computational requirements is attained while reducing degradation in visual quality. As discussed further below, such partitioning and coding mode decision techniques may include a selection technique based on using open-loop data to select a set of CUs to be tested and another selection technique that evaluates candidate CUs in a specific order that favors early convergence to a partition with sufficient computational complexity versus visual quality tradeoffs.

In the following discussion, selecting a partitioning and coding mode decision algorithm for each LCU is discussed. Although discussion is directed to selection for an LCU for the sake of clarity of presentation, a partitioning and coding mode decision algorithm may be selected for any coding block of a picture or frame. For example, as used herein, the term coding block indicates any block or region of a picture that is to be partitioned into sub-blocks for coding such that each sub-block may be coded using a differing mode. For example, the term coding block may pertain to an LCU, a macroblock, a block, or the like. In the following discussion, the use of the term LCU also pertains to any other pertinent coding block.

FIG. 1 is an illustrative diagram of an example system 100 for providing video coding, arranged in accordance with at least some implementations of the present disclosure. As shown in FIG. 1, system 100 includes a partitioning and mode decision module 101 and an encoder 102. As shown, partitioning and mode decision module 101, which may be characterized as a partitioning, motion estimation, and mode decision module or the like, receives input video 111 and generates largest coding unit (LCU) partitions and corresponding coding modes (intra/inter modes) data 112, which may be characterized as final partitioning/mode decisions data or the like. For example, for each LCU of each picture of input video 111, partitioning and mode decision module 101 may provide a final partition decision (i.e., data indicative of how the LCU is to be partitioned into coding units (CU)), a coding mode for each CU (i.e., an inter mode, an intra mode, or the like), and information, if needed, for the coding mode (i.e., a motion vector for inter coding).

As shown, encoder 102 receives LCU partitions and intra/inter modes data 112 and generates a bitstream 113 such as a standards compliant bitstream. For example, encoder 102 implements LCU partitions and intra/inter modes data 112 such that encoder 102 does not make such decisions but instead implements those decision made by partitioning and mode decision module 101 to generate a standards compliant bitstream 113.

As shown, system 100 receives input video 111 for coding and system provides video compression to generate bitstream 113 such that system 100 may be a video encoder implemented via a computer or computing device or the like. Bitstream 113 may be any suitable bitstream such as a standards compliant bitstream. For example, bitstream 113 may be H.264/MPEG-4 Advanced Video Coding (AVC) standards compliant, H.265 High Efficiency Video Coding (HEVC) standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to pictures and largest coding units and/or coding blocks for the sake of clarity of presentation. However, such pictures may be characterized as frames, video frames, sequences of frames, video sequences, or the like, and such largest coding units and/or coding blocks may be characterized as coding units, macroblocks, sub-units, sub-blocks, regions, sub-regions, etc. Typically, the terms coding block and coding unit are used interchangeably herein. For example, a picture or frame of color video data may include a luma plane or component (i.e., luma pixel values) and two chroma planes or components (i.e., chroma pixel values) at the same or different resolutions with respect to the luma plane. Input video 111 may include pictures or frames that may be divided into largest coding units or coding blocks that may, in turn, be divided into coding units and/or coding sub-blocks of any size, which contain data corresponding to, for example, M×N coding units or blocks of pixels. Such coding units or blocks may include data from one or more planes or color channels of pixel data. As used herein, the term coding units or blocks may include coding units, blocks, macroblocks, or the like of any suitable sizes. As will be appreciated such blocks may also be divided into sub-blocks for prediction, transform, etc.

Figure 2:
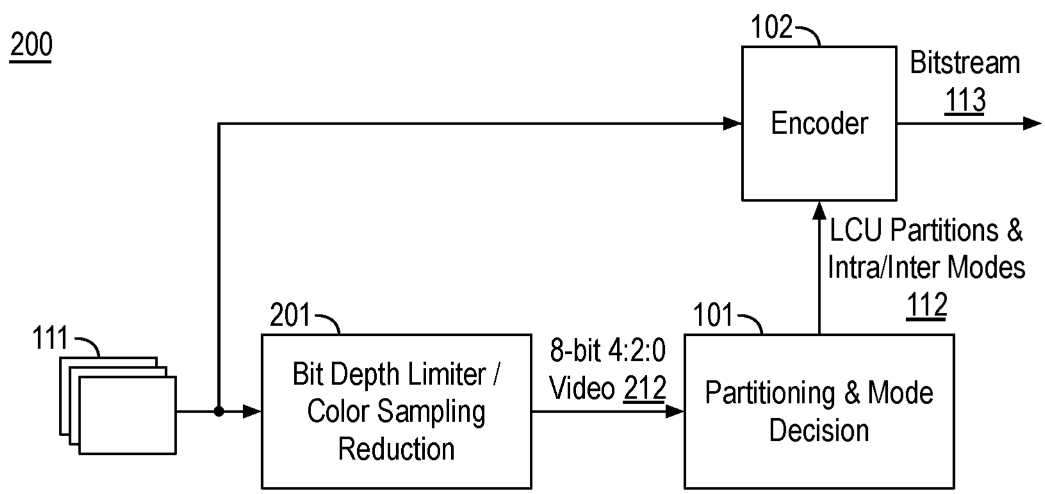
FIG. 2 is an illustrative diagram of another example system for providing video coding.

FIG. 2 is an illustrative diagram of another example system 200 for providing video coding, arranged in accordance with at least some implementations of the present disclosure. As shown in FIG. 2, system 200 includes the components of system 100 with the addition of a bit depth limiter/color sampler reduction module 201. For example, bit depth limiter/color sampler reduction module 201 may receive input video 111 and perform one or both of bit depth limiting to lower the bit depth of input video 111 (i.e., by keeping the most significant bits and discarding least significant bits) and color sample reduction to reduce the color sampling of input video 111 to provide reduced bit depth and/or reduced color sampling video 212, which in the illustrated embodiment is provided as 8-bit 4:2:0 video. For example, partitioning and mode decision module 101 may operate on reduced bit depth and/or reduced color sampling video for the generation of LCU partitions and intra/inter modes data 112 while encoder 102 performs operations on full bit depth and/or full color sampling input video 111. In an embodiment, input video 111 is 10-bit 4:2:2 video and, as shown, reduced bit depth and/or reduced color sampling video 212 is 8-bit 4:2:0 video. However, input video 111 and reduced bit depth and/or reduced color sampling video 212 may be any video data such that input video 111 is at a higher bit depth and/or a higher color sampling than reduced bit depth and/or reduced color sampling video 212. Such reduction in bit depth and/or color sampling may reduce computational resources and/or memory transfers requirements for partitioning and mode decision module 101.

For example, input video 111 may be received with a bit depth that is at least 8 bits (i.e. the luma and chroma values associated with a given source pixel/sample are represented using at least 8 bits each, e.g., 10 bits per value). Relative to 8-bit data, data with more than 8 bits per pixel/sample requires more memory transfers (to move the data between memory and processor) and more complex arithmetic operations. To reduce the impact of high bit depth on the required memory and computational resources, input video 111 may be converted to 8-bit data by keeping the eight most significant bits. For example, for 10-bit input video data, the two least significant bits are discarded. Furthermore, input video 111 with higher color representation (e.g., 4:2:2 or 4:4:4) includes increased chroma information. However, processing chroma information in 4:2:0 video data, where the number of chroma samples is half of the number of luma samples may provide a balance between the video quality value in the use of chroma information and the computational and memory transfer cost thereof.

Figure 3:
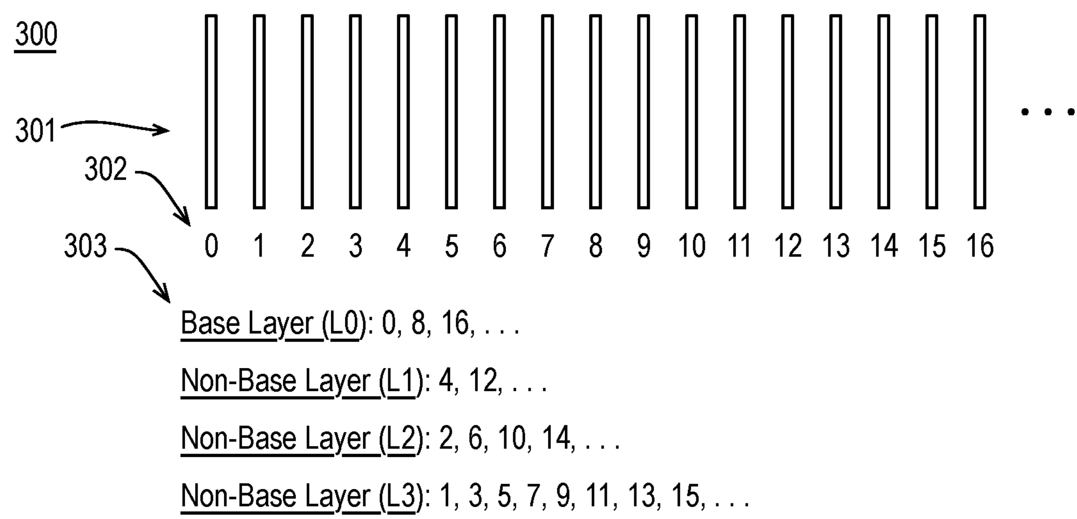
FIG. 3 illustrates an example group of pictures.

FIG. 3 illustrates an example group of pictures 300, arranged in accordance with at least some implementations of the present disclosure. As shown in FIG. 3, group of pictures 300 may include any number of pictures 301 such as 64 pictures (with 0-16 being illustrated) or the like. Furthermore, pictures 301 may be provided in a temporal order 302 such that pictures 301 are presented in temporal order while pictures 301 are coded in a coding order (not shown) such that coding order is different with respect to temporal order 302. Furthermore, pictures 301 may be provided in a picture hierarchy 303 such that a base layer (L0) of pictures 301 includes pictures 0, 8, 16, and so on; a non-base layer (L1) of pictures 301 includes pictures 4, 12, and so on; a non-base layer (L2) of pictures 301 includes pictures 2, 6, 10, 14, and so on; and a non-base layer (L3) of pictures 301 includes pictures 1, 3, 5, 7, 9, 11, 13, 15, and so on. For example, moving through the hierarchy, for inter modes, pictures of L0 may only reference other pictures of L0, pictures of L1 may only reference pictures of L0, pictures of L2 may only reference pictures of L0 or L1, and pictures of L3 may reference pictures of any of L0-L2. For example, pictures 301 include base layer pictures and non-base layer pictures such that base layer pictures are reference pictures for non-base layer pictures but non-base layer pictures are not reference pictures for base layer pictures as shown. In an embodiment, input video 111 includes group of pictures 300 and/or systems 100, 200 implement group of pictures 300 with respect to input video 111. Although illustrated with respect to example, group of pictures 300, input video 111 may have any suitable structure implementing group of pictures 300, another group of pictures format, etc.

In an embodiment, a prediction structure for coding video includes groups of pictures such as group of pictures 300. For example, in the context of broadcast and streaming implementations, the prediction structure may be periodic and may include periodic groups of pictures (GOPs). In an embodiment, a GOP includes about 1-second of pictures organized in the structure described in FIG. 3, followed by another GOP that starts with an I picture, and so on.

Figure 4:
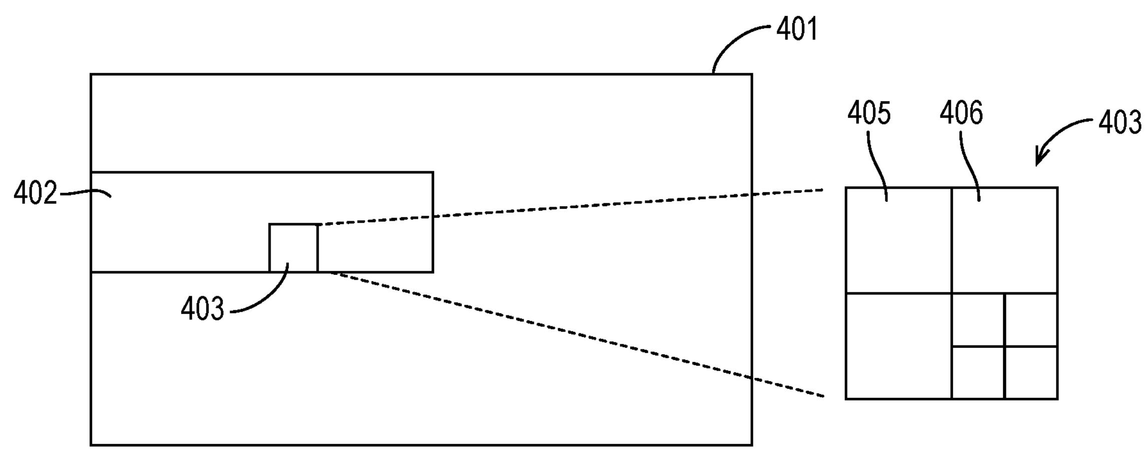
FIG. 4 illustrates an example video picture.

FIG. 4 illustrates an example video picture 401, arranged in accordance with at least some implementations of the present disclosure. Video picture 401 may include any picture of a video sequence or clip such as a VGA, HD, Full-HD, 4K, 8K, etc. video picture. For example, video picture 401 may be any of pictures 301 of group of pictures 300. As shown, video picture 401 may be segmented or partitioned into one or more slices as illustrated with respect to slice 402 of video picture 401. Furthermore, video picture 401 may be segmented or partitioned into one or more LCUs as illustrated with respect to LCU 403, which may, in turn, be segmented into one or more coding units as illustrated with respect to CUs 405, 406 and/or prediction units (PUs) and transform units (TUs), not shown.

Figure 5:
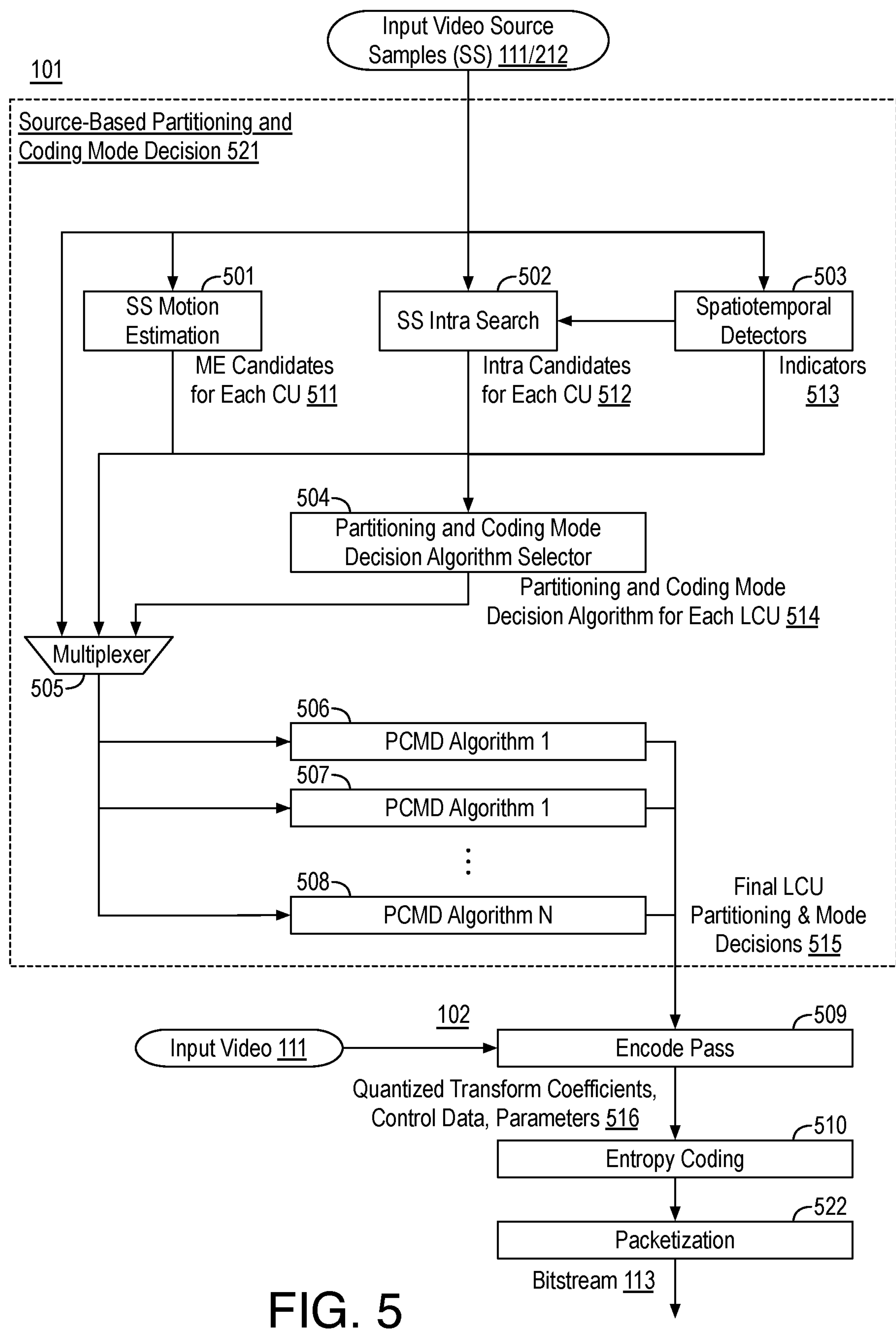
FIG. 5 is an illustrative diagram of an example partitioning and mode decision module and an example encoder.

FIG. 5 is an illustrative diagram of an example partitioning and mode decision module 101 and an example encoder 102, arranged in accordance with at least some implementations of the present disclosure. As shown in FIG. 5, partitioning and mode decision module 101 may include or implement a source-based partitioning and coding mode decision module 521 that may include a source samples (SS) motion estimation module 501, a SS intra search module 502, one or more spatiotemporal detectors 503, a partitioning and coding mode decision algorithm selector 504, and a plurality of partitioning and coding mode decision (PCMD) algorithm modules 506, 507, 508. As shown, source-based partitioning and coding mode decision module 521 implements multiple PCMD algorithm modules 506, 507, 508 (e.g., any number, N, of such modules). For each LCU of a current picture, one of PCMD algorithm modules 506, 507, 508 is selected by partitioning and coding mode decision algorithm selector 504. Depending on the PCMD algorithm for the LCU, the corresponding one of PCMD algorithm modules 506, 507, 508 applies the PCMD algorithm to generate a final LCU partitioning and mode decision 515 for the LCU using the data from multiplexer 505.

As discussed, source-based partitioning and coding mode decision module 521 may implement any number multiple PCMD algorithm modules 506, 507, 508. In an embodiment, the multiple PCMD algorithms include two or more of the following: open loop prediction (mode 1), open loop prediction with light refinement (mode 2), open loop prediction with refinement (mode 3), light binary depth partitioning (BDP) (mode 4), full binary depth partitioning (BDP) (mode 5), advanced video coding (AVC) equivalent (mode 6), and full search (mode 7). For example, the multiple PCMD algorithms are organized from fastest (and least likely to achieve high quality) to slowest (and most likely to achieve high quality) in ascending mode order. For example, in ascending mode order, the modes have greater computational complexity and therefore greater computation cost.

For example, each of the multiple PCMD algorithms may be assigned a corresponding level or cost. In an embodiment, a least complex PCMD algorithm is assigned a cost of 100 and each subsequent PCMD algorithm (of increasing complexity) is assigned a cost that is percentage multiplier of the assigned cost of the least complex PCMD algorithm. In the context of the discussed modes, open loop prediction (mode 1) may be assigned a cost of 100, open loop prediction with light refinement (mode 2) may be assigned a cost of 106, open loop prediction with refinement (mode 3) may be assigned a cost of 110, light binary depth partitioning (BDP) (mode 4) may be assigned a cost of 123, full binary depth partitioning (BDP) (mode 5) may be assigned a cost of 129, advanced video coding (AVC) equivalent (mode 6) may be assigned a cost of 138, and full search (mode 7) may be assigned a cost of 155. For example, each of the N algorithms may be provided associated complexity level or cost $C\_i=1, 2, \ldots, N$ such that the complexity level or cost $C_i$ increases from $C_0$ to $C_N$, and is a reflection of the speed impact and the video quality impact of the algorithm (i.e., $C_0$ corresponds to the algorithm with the smallest speed impact but potentially the largest adverse effect on video quality and vice versa for $C_N$). Although discussed with respect to costs having a baseline of 100, any suitable costs may be used. As discussed herein, such costs may be implemented as an LCU based cost such that the assigned cost of implementing open loop prediction with light refinement (mode 2) is a cost of 106 for an LCU, the assigned cost of implementing advanced video coding (AVC) equivalent (mode 6) is a cost of 138 for an LCU, and so on. Although discussed herein with respect to the above listed PCMD algorithms, any number and types of PCMD algorithms may be used.

As shown, source-based partitioning and coding mode decision module 521 receives input video 111 or reduced bit depth and/or reduced color sampling video 212 and source-based partitioning and coding mode decision module 521 generates final LCU partitioning and mode decisions data 515. Final LCU partitioning and mode decisions data 515 may be any suitable data that indicates or describes partitioning for the LCU into CUs and a coding mode decision for each CU of the LCU. For example, the coding mode decisions may include an intra mode (i.e., one of the available intra modes based on the standard being implemented) or an inter mode (i.e., skip, merge, or motion estimation, ME). Furthermore, final LCU partitioning and mode decisions data 515 may include any additional data needed for the particular mode (e.g., a motion vector for an inter mode).

For example, in the context of HEVC, a coding tree unit may be 64×64 pixels, which may define a LCU. An LCU may be partitioned for coding into CUs via quad-tree partitioning such that the CUs may be 32×32, 16×16 pixels, or 8×8 pixels. Such partitioning may be indicated by final LCU partitioning and mode decisions data 515.

As shown, SS motion estimation module 501 receives input video 111 or reduced bit depth and/or reduced color sampling video 212. In the following discussion, input video 111 or reduced bit depth and/or reduced color sampling video 212 is characterized as input video 111, 212 for the sake of clarity of presentation. SS motion estimation module 501 performs a motion search for CUs of a current picture of input video 111, 212 using one or more reference pictures of input video 111, 212. That is, SS motion estimation module 501 performs a motion search for a CU of a current picture by searching for matching CU(s) of one or more reference pictures of input video 111, 212 such that the reference pictures include original pixel samples of input video 111, 212. For example, SS motion estimation module 501 performs the motion search without reconstructing pixels into reconstructed reference pictures using a local decode loop. As shown, SS motion estimation module 501 generates motion estimation candidates 511 (i.e., MVs) corresponding to CUs of a particular partitioning of a current LCU under evaluation. For example, for each CU, one or more MVs may be provided. In an embodiment, motion estimation candidates 511 include a best list0 (L0) candidate, a best list1 (L1) candidate, and a best bi-prediction candidate. In an embodiment, SS motion estimation module 501 uses a non-standards compliant interpolation filter to generate an interpolated search region for sub-pel MV search.

Furthermore, SS intra search module 502 receives input video 111, 212 and SS intra search module 502 evaluates intra modes for CUs of a current picture of input video 111, 212 using the current picture of input video 111, 212. That is, SS intra search module 502 performs an intra mode evaluation for a CU of a current picture by comparing the CU to an intra prediction block generated (based on the current intra mode being evaluated) using original pixel samples of the current picture input video 111, 212. For example, SS intra search module 502 performs the intra mode evaluation without reconstructing pixels into reconstructed pixel samples (e.g., of previously coded CUs) using a local decode loop. As shown, SS intra search module 502 generates intra candidates 512 (i.e., selected intra modes) corresponding to CUs of a particular partitioning of a current LCU under evaluation. For example, for each CU, one or more intra candidates may be provided.

Also as shown, spatiotemporal detectors 503 receives input video 111, 212 and spatiotemporal detectors 503 generates indicators corresponding to pictures of input video 111, 212, indicators corresponding to LCUs of input video 111, 212, or indicators corresponding to CUs of input video 111, 212. For example, indicators 513 may include picture level indicators, LCU level indicators, and/or CU level indicators. For example, indicators 513 may include, at the LCU level, a measure of spatio-temporal complexity (e.g., measured by parameters such as variance, edge intensity, and/or motion estimation sum of absolute differences), subjective importance (e.g., a factor or level of indicating risk level for aura, trailing artifacts, etc.), an indicator the LCU is in an isolated non-homogeneous areas, an indicator the LCU is in an extreme luminance area, an indicator the LCU is in a grass area, an indicator the LCU is in a logo area, an indicator the LCU is in a high contrast area, an indicator the LCU is in a potentially blocky area, or any other features, indicators, or detectors discussed herein.

Partitioning and coding mode decision algorithm selector 504 receives motion estimation candidates 511, intra candidates 512, and indicators 513 and partitioning and coding mode decision algorithm selector 504 selects a partitioning and coding mode decision technique or algorithm from multiple available partitioning and coding mode decision techniques for each LCU as provided by partitioning and coding mode decision algorithm 514. Partitioning and coding mode decision algorithm 514 may include any suitable data indicative of a partitioning and coding mode decision technique selection for each LCU of LCUs of pictures of input video 111, 212 such as technique indicators or the like. Furthermore, motion estimation candidates 511, intra candidates 512, indicators 513, and partitioning and coding mode decision algorithm 514 are multiplexed by multiplexer 505 and provided to PCMD algorithm modules 506, 507, 508. On a per LCU basis, for example, one of the PCMD algorithms is implemented by the corresponding one of PCMD algorithm modules 506, 507, 508 for the LCU based on partitioning and coding mode decision algorithm 514.

As used herein, the term selection complexity or complexity with respect to partitioning and coding mode decision indicates a computational complexity of the technique in terms of number of partitions to be evaluated, number of modes to be evaluated, etc. For example, a partitioning and coding mode decision technique that evaluates more partitions of an LUC would be more complex than one that evaluates fewer partitions. Similarly, a partitioning and coding mode decision technique that evaluates more coding modes for each partition of an LUC would be more complex than one that evaluates fewer coding modes. As is discussed further herein, full search (mode 7) has the greatest selection complexity and the following modes have reducing selection complexity in turn, as is reflected by their assigned costs: advanced video coding (AVC) equivalent (mode 6), full binary depth partitioning (BDP) (mode 5), light binary depth partitioning (BDP) (mode 4), open loop prediction with refinement (mode 3), open loop prediction with light refinement (mode 2), and open loop prediction (mode 1) without refinement.

Depending on the selected partitioning and coding mode decision technique from among the discussed techniques or algorithms as implemented by PCMD algorithm modules 506, 507, 508, the selected one of PCMD algorithm modules 506, 507, 508 provides final LCU partitioning and mode decisions data 515 for the particular LCU. Similarly, for each LCU of a current picture, the selected one of PCMD algorithm modules 506, 507, 508 provides final LCU partitioning and mode decisions data 515 for each LCU such that final LCU partitioning and mode decisions data 515 indicates or describes partitioning for each LCU into CUs and a coding mode decision for each CU of each LCU.

As shown, encoder 102 may include or implement encode pass module 509, entropy coding module 510, and packetization module 522. Encode pass module 509 receives input video 111 and final LCU partitioning and mode decisions data 515 and encode pass module 509 generates quantized transform coefficients, control data, and parameters 516, which may be entropy encoded by entropy coding module 510 and packetized by packetization module 522 to generate bitstream 113. For example, encode pass module 509 receives input video 111 and final LCU partitioning and mode decisions data 515.

Based on final LCU partitioning and mode decisions data 515, encode pass module 509 generates intra reference pixel samples for intra CUs (as needed) using neighboring reconstructed pixel samples (generated via a local decode loop) to provide an intra prediction CU for intra coding mode CUs. For inter mode CUs, a prediction CU may be generated by retrieving previously reconstructed pixel samples for a CU indicated by a MV or MVs from a reconstructed reference picture or pictures and, if needed, combining the retrieved reconstructed pixel samples to generate the prediction CU. A residual is then generated for the current CU by differencing the current CU and the prediction CU. The residual is then forward transformed and forward quantized to generate quantized transform coefficients, which are included in quantized transform coefficients, control data, and parameters 516. Furthermore, in a local decode loop, for example, the transform coefficients are inverse quantized and inverse transformed to generate a reconstructed residual for the current CU. The reconstruction for the current CU may include adding the reconstructed residual and the prediction CU (as discussed above) to generate a reconstructed CU. The reconstructed CU may be combined with other CUs to reconstruct the current picture or portions thereof using additional techniques such as sample adaptive offset (SAO) filtering, which may include generating SAO parameters (which are included in quantized transform coefficients, control data, and parameters 516) and implementing the SAO filter on reconstructed CUs and/or deblock loop filtering (DLF), which may include generating DLF parameters (which are included in quantized transform coefficients, control data, and parameters 516) and implementing the DLF filter on reconstructed CUs. Such reconstructed CUs may be provided as reference pictures (e.g., stored in a reconstructed picture buffer) for example. Such reference pictures or portions thereof are provided as reconstructed samples, which are used for the generation of prediction CUs (in inter and intra modes) as discussed above.

As shown, quantized transform coefficients, control data, and parameters 516, which include transform coefficients for residual coding units, control data such as final LCU partitioning and mode decisions data (i.e., from final LCU partitioning and mode decisions data 515), and parameters such as SAO/DLF filter parameters, may be entropy encoded and packetized to form bitstream 113. Bitstream 113 may be any suitable bitstream such as a standards compliant bitstream. For example, bitstream 113 may be H.264/MPEG-4 Advanced Video Coding (AVC) standards compliant, H.265 High Efficiency Video Coding (HEVC) standards compliant, VP9 standards compliant, etc.

As discussed, partitioning and mode decision module 101 generates partitioning and mode decision data for LCUs of input video 111 using original pixel samples and encoder 102 implements the partitioning and mode decision data on input video 111 (including use of a local decode loop) to generate bitstream 113. Use of only original pixel samples for the generation of partitioning and mode decision data may offer decoupling between partitioning and mode decision module 101 (which may be implemented as hardware such as dedicated integrated circuit) and encoder 102 (which may be implemented as separate hardware such as a separate dedicated integrated circuit).

Discussion now turns to selection of a partitioning and coding mode decision algorithm or technique for LCUs as performed, for example, by partitioning and coding mode decision algorithm selector 504. In an embodiment, detector-based switching between the N discussed algorithms approaches is provided based on the spatiotemporal characteristics of pictures and/or LCUs and/or other detectors as discussed herein. For example, such spatiotemporal characteristics may include LCU variance, SS motion estimation and/or SS intra search distortion, edge information, likelihood of aura artifacts, likelihood of trailing artifacts, likelihood an LCU is in an isolated non-homogeneous area, likelihood an LCU is in an extreme luminance area, likelihood an LCU is in a grass areas, likelihood an LCU is in a logo area, likelihood an LCU is in a high contrast area, likelihood an LCU is in a blocky area, etc.

In an embodiment, implementation of partitioning and mode decision module 101 and encoder 102 is based on the following assumptions: partitioning and mode decision module 101 and encoder 102 are block based (i.e., operate on blocks such as LCUs of input pictures), a largest block size (e.g., LCU size) is defined, coding blocks or units, including the largest block or LCU itself, may be subdivided into smaller coding blocks or units according to set partitioning rules (e.g., quad-tree partitioning in HEVC, etc.), and, as discussed, partitioning and mode decision module 101 and encoder 102 are decoupled.

Figure 6:
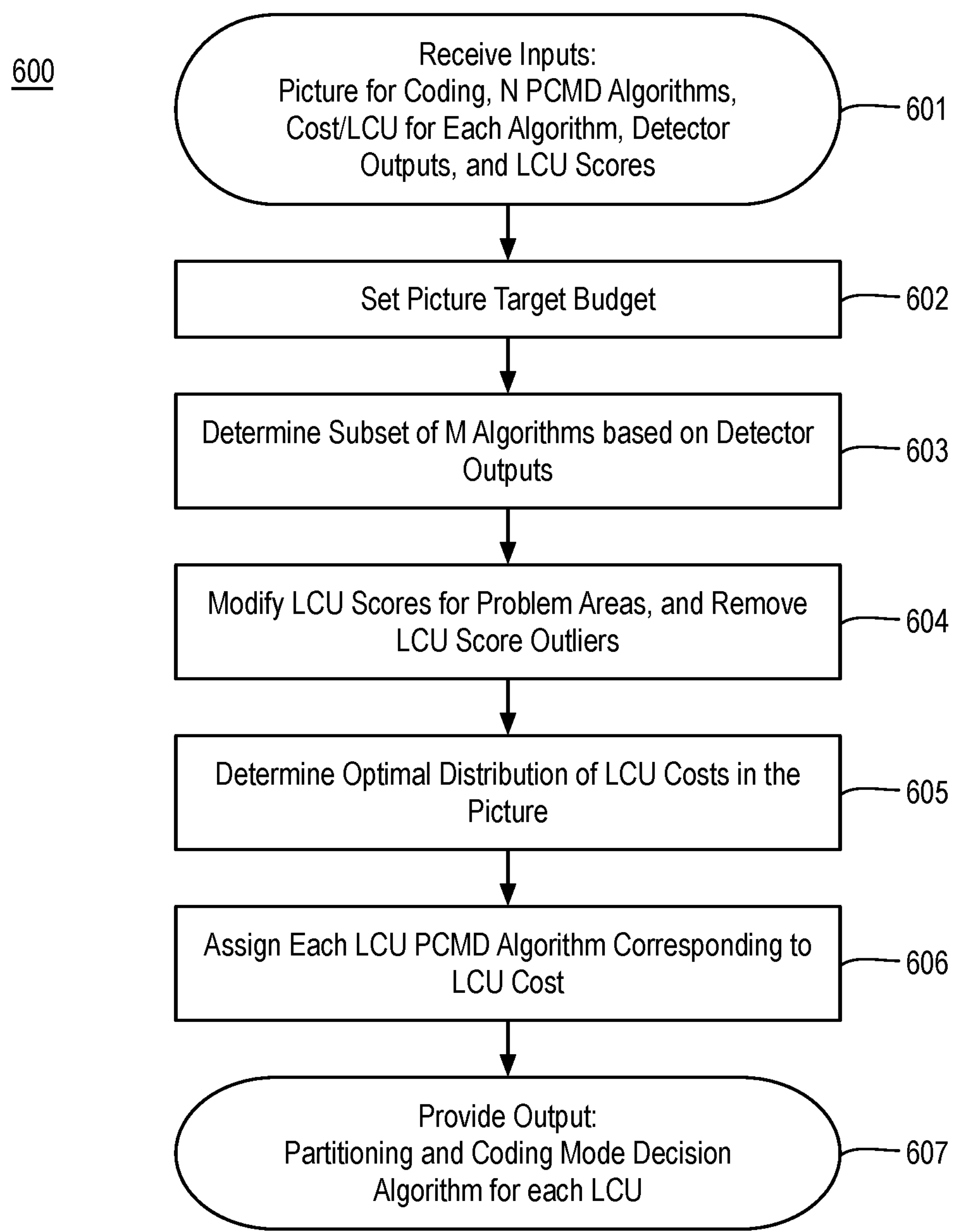
FIG. 6 is a flow diagram illustrating an example process for selecting a partitioning and coding mode decision algorithm for each coding block of a picture.

FIG. 6 is a flow diagram illustrating an example process 600 for selecting a partitioning and coding mode decision algorithm for each coding block of a picture, arranged in accordance with at least some implementations of the present disclosure. Process 600 may include one or more operations 601-605 as illustrated in FIG. 6. Process 600 may be performed by a system (e.g., system 100 as discussed herein) to select a partitioning and coding mode decision algorithm from multiple partitioning and coding mode decision algorithms. In an embodiment, process 600 is implemented by partitioning and coding mode decision algorithm selector 504 of partitioning and mode decision module 101.

As discussed elsewhere herein, an LCU score for each LCU of a picture may be determined using any suitable technique or techniques such that the LCU score is indicative of an expected complexity of encoding the LCU. For example, the LCU score may be characterized as an encode complexity score. In an embodiment, the LCU score is determined based on spatio-temporal characteristics of the LCU. For example, the LCU score may be a function of the spatiotemporal picture and/or LCU characteristics for which LCU partitioning is highly sensitive. Such characteristics or detectors include variance, ME/intra prediction distortion, edge information, and likelihood of aura and/or trailing artifacts. In an embodiment, the LCU score for an LCU is the best intra distortion (e.g., the distortion for the best intra mode as provided by intra candidates 512) for LCUs in an I-slice or the best motion estimation (ME) distortion (e.g., the distortion for the best ME candidate mode as provided by motion estimation candidates 511) for LCUs that are not in an I-slice. In an embodiment, the LCU score for an LCU is the best distortion for the LCU.

Processing begins at operation 601, where an input picture, multiple partitioning and coding mode decision algorithms (i.e., N algorithms), a cost per LCU for each of the multiple partitioning and coding mode decision algorithms, LCU scores, and detector outputs are received. The input picture may be any suitable picture discussed herein. The multiple partitioning and coding mode decision algorithms may include any number of any suitable algorithms. For example, seven algorithms as discussed above may be received. Furthermore, the cost per LCU (e.g., cost per coding unit) for each algorithm may be determined using any suitable technique or techniques so long as the cost per LCU is a monotonically increasing function with partitioning and coding mode decision algorithm complexity. The detector outputs may be any suitable LCU level, picture level, video coding level, etc. detectors as are discussed further herein. The LCU scores may be any suitable LCU scores as discussed herein.

Processing continues at operation 602, where a picture budget for the input picture is set. The picture budget may be determined or set using any suitable technique or techniques. For example, the picture budget may be set based on one or more detectors. In an embodiment, determining the target coding cost for the picture is based on one or more of a coding mode of the input video, a resolution of the picture, a temporal layer of the picture (e.g., whether or not the picture is a reference or non-reference picture), or an indicator of whether or not the picture is a visually important picture. Such indicators or detectors may be provided via indicators 513 for example. In an embodiment, the picture budget is set by selecting a representative algorithm (or corresponding cost) for LCUs of the picture and multiplying the per LCU cost and the number of LCUs in the picture. An example of setting the level selection mechanism is given in Table 1.

TABLE 1

Setting Target Budget per LCU as a Function of Detector Outputs

| Encoder Mode | Resolution | Temporal Layer | Reference Picture? | Visually Important Picture? | Budget/LCU |
|---|---|---|---|---|---|
| 1 | <=1080 p | — | Yes | — | FULL_SEARCH_COST |
| | | — | No | — | BDP_F_COST |
| | >1080 p | 0 | — | — | FULL_SEARCH_COST |
| | | >0 | Yes | — | 125 |

TABLE 1-continued

Setting Target Budget per LCU as a Function of Detector Outputs

| Encoder Mode | Resolution | Temporal Layer | Reference Picture? | Visually Important Picture? | Budget/LCU |
|---|---|---|---|---|---|
| | | | No | — | 120 |
| 2 | All resolutions | 0 | — | — | FULL_SEARCH_COST |
| | | >0 | Yes | — | BDP_F_COST |
| | | >0 | No | — | OLP_R_COST |
| 3 | <=1080 p | 0 | — | — | BDP_F_COST |
| | | >0 | Yes | — | 116 |
| | | >0 | No | — | OLP_R_COST |
| | >1080 p | 0 | — | — | AVC_COST |
| | | >0 | Yes | — | BDP_L_COST |
| | | >0 | No | — | OLP_R_COST |
| >=4 | <=1080 p | 0 | — | — | 122 |
| | | >0 | Yes | — | 116 |
| | | >0 | No | — | OLP_R_COST |
| | >1080 p | 0 | — | — | 122 |
| | | >0 | Yes | 1 | OLP_R_COST |
| | | >0 | Yes | 0 | OLP_LR_COST |
| | | >0 | No | 1 | 103 |
| | | >0 | No | 0 | 101 |

In the example of Table 1 FULL_SEARCH_COST is the cost of full search (mode 7), BDP_F_COST is the cost of full BDP (mode 5), OLP_R_COST is the cost of open loop prediction with refinement (mode 3), AVC COST is the cost of AVC equivalent (mode 6), BDP_L_COST is the cost of light BDP (mode 4), and OLP_LR_COST is the cost of open loop prediction with light refinement (mode 2). The other costs (e.g., 125, 120, 116, 122, 103, 101) are not associated with a particular algorithm but illustrate that other coding costs may be used. For example, an increased budget may be provided for high quality coding modes, lower resolution pictures, base layer pictures, and visually important pictures. In Table 1, encoder code corresponds to a selected mode for encoding the entirety of received input video such that mode 1 is higher quality (and slower) than mode 2, which is higher quality than mode 3, and so on such that a lower number indicates higher quality and a higher number indicates lower quality encoding. In an embodiment, all else being equal, the cost (or budget) per LCU decreases in going from high quality but slow encoder mode to lower quality but faster encoder modes. In an embodiment, all else being equal, the cost (or budget) per LCU decreases in going from low resolution to high resolution pictures (although the data in Table 1 does not fully correlate with this guideline). In an embodiment, all else being equal, the cost (or budget) per LCU decreases in going from base layer pictures to higher layer pictures, including going from reference pictures to non-reference pictures. In an embodiment, all else being equal, the cost (or budget) per LCU decreases in going from visually important pictures to visually less important pictures. As will be appreciated, the opposite of each of the above detectors will result in an opposite response in the cost (or budget) per LCU.

The determination of whether a picture is visually important may be made using any suitable technique or techniques. In an embodiment, visually important pictures are those that are susceptible to the appearance of video quality artifacts. In an embodiment, a picture is a visually important picture when the coding mode (e.g., encoder mode of Table 1) exceeds a coding mode quality threshold, the picture has motion activity less than a motion masking threshold, and the picture has a noise level greater than a noise threshold. In an embodiment, a picture is a visually important picture when the coding mode (e.g., encoder mode of Table 1) exceeds a coding mode quality threshold, the picture has motion activity greater than a very low motion threshold and less than a motion masking threshold, and the picture has a noise level greater than a noise threshold. For example, the coding mode quality threshold may be 2 such that the coding mode is not the lowest or second lowest quality mode available. For example, the motion activity of the picture may be measured as a number of LCUs in the picture that, when compared to collocated LCUs in a reference picture have zero sums of absolute difference or sums of absolute difference that are less than a threshold. Such low SAD when comparing an LCU to a collocated LCU indicates zero or no motion of the LCU. Visually important pictures are, then, those pictures with motion (e.g., as indicated by the number of LCUs that have a SAD exceeding a threshold) that indicates one or both of: motion greater than a low or no motion (e.g., the number LCUs that have a SAD exceeds a first threshold) and motion less than that which would mask any artifacts (e.g., the number LCUs that have a SAD does not exceed a second threshold). That is, visually important pictures are those that indicate low to moderate motion (and not very low motion or fast motion). Furthermore, the picture noise level may be generated using any suitable technique or techniques such as picture variance and/or edge detection. As discussed, in such contexts, visually important pictures are those that have a high coding mode, low to moderate motion, and high picture noise.

In another embodiment, a picture is a visually important picture when the picture is determined to be a complex picture including, for example, light foreground areas and dark background areas. In such a context, a picture may be deemed to be a visually important picture when the picture has a percentage of pixels having luma values less than a low luma threshold that is greater than a first threshold and a percentage of pixels having luma values greater than a high luma threshold that is greater than a second threshold. For example, the percentage of pixels having luma values less than a low luma threshold being greater than a first threshold may indicate the picture has a substantial light area. Similarly, the percentage of pixels having luma values greater than a high luma threshold being greater than a second threshold may indicate the picture has a substantial dark area.

Processing continues at operation 603, where a subset of the multiple partitioning and coding mode decision algorithms (i.e., N algorithms) received at operation 601 may optionally be selected. The subset of the multiple partitioning and coding mode decision algorithms may be selected using any suitable technique or techniques. In an embodiment, the selection is based on the one or more detectors including a coding mode of the input video, a temporal layer of the picture, or an indicator of whether or not the picture is a visually important picture.

TABLE 2

Selecting Partitioning and Coding Mode Decision Algorithms Subset as a Function of Detector Outputs

| Encoder Mode | Temporal Layer | Visually Important Picture? | Number of segments | Thresholds | Algorithms Subset |
|---|---|---|---|---|---|
| >=4 | 0 | 1 | 2 | 50 | BDP_F, Full_Search |
| | | 0 | 4 | 25, 50, 75 | OLP, OLP_LR, BDP_L, BDP_F |
| | >0 | — | 3 | 100/3, 200/3 | OLP, OLP_LR, OLP_R |
| 3 | 0 | 1 | 2 | 50 | BDP_F, Full_Search |
| | | 0 | 5 | 20, 40, 60, 80 | OLP, OLP_LR, BDP_L, BDP F, Full_Search |
| | >0 | — | 4 | 25, 50, 75 | OLP, OLP_LR, OLP_R, BDP_L |
| 2>= | 0 | — | 2 | 50 | BDP_F, Full_Search |
| | >0 | — | 6 | i * 100/6; i = 1, . . . , 5 | OLP, OLP_LR, BDP_L, BDP_F, Full_Search |

In the example of Table 2, OLP is open loop prediction (mode 1), OLP_LR is open loop prediction with light refinement (mode 2), OLP_R is open loop prediction with refinement (mode 3), BDP_L is light binary depth partitioning (BDP) (mode 4), BDP_F is full binary depth partitioning (BDP) (mode 5), and Full_Search is full search (mode 7). In addition to providing example subsets of the multiple partitioning and coding mode decision algorithms for different detectors, Table 2 also provides example thresholds for dividing a range of LCU scores into sub-ranges as a percentage. For example, for an encoder mode (e.g., coding mode of 3), a base layer (e.g., temporal layer of 0), a visually important picture (e.g., indicated as 1), a subset of BDP_F and Full_Search are used. The range of LCU scores (as discussed below) is then divided into two segments (or sub-ranges) with a threshold between the two segments (or sub-ranges) at 50% of the difference between the max and min LCU scores of the range (e.g., at the half-way point of the range).

As discussed, a subset of partitioning and coding mode decision algorithms may be selected for use. For example, detector outputs may be used to select the M (e.g., M<N) selection algorithms to use along with the corresponding cost per LCU. LCU score thresholds will be used in the assignment of various algorithms to different LCUs. The guidelines for selecting the subset of algorithms to use are as follows. In an embodiment, all else being equal, the number of algorithms used is the same or decreases in going from the high quality but slow encoder mode to the fast but low quality encoder mode. In an embodiment, all else being equal, high quality but slow selection algorithms are assigned to base layer pictures and faster but lower quality algorithms are considered for higher temporal layers. In an embodiment, all else being equal, fewer and higher quality algorithms are used for visually important pictures as compared to non-visually important pictures.

Processing continues at operation 604, where some LCU scores may be modified for potential problem areas or visually important areas to generate modified LCU scores and/or LCU score outliers may be removed. For example, for those LCUs that are identified as visually important, the LCU score may be modified. As used herein, the term visually important applies to those areas or LCUs that are either potentially problematic (i.e. they may be susceptible to the appearance of VQ artifacts), that are important for the human visual system, that are important for visual quality, or that could potentially mask video quality artifacts. Such LCU score modification may benefit a potentially problematic LCU with a better partitioning and coding mode decision algorithm upon selection of partitioning and coding mode decision algorithms, or assign lower performance partitioning and coding mode decision algorithms to the LCUs that could mask video quality artifacts, as discussed herein with respect to operations 605, 606.

In an embodiment, visually important LCUs include LCUs that have large motion estimation distortions. For example, such LCUs may be potentially problematic for encode. In an embodiment, such potentially problematic LCUs are identified when the LCU score indicates a prediction error of more than 2 per pixel (e.g., LCU_Score>64×64×2). In an embodiment, such potentially problematic LCUs are identified when the LCU score indicates a prediction error of more than 2 per pixel (e.g., LCU_Score>64×64×2) and ME for 32×32 partitions of the LCU provides a sum of distortions less than the LCU but greater than zero (e.g., sum of best four 32×32 distortions<LCU_Score and sum of best four 32×32 distortions !=0). In such contexts, the LCU score is increased. Furthermore, an increase of the LCU score may be based on a relative difference between the LCU score and the sum of best four 32×32 distortions. In an embodiment, when the relative difference is greater, the LCU score is increased by a greater amount. In an embodiment, a relative difference is determined as Relative Score difference=[LCU_Score−(sum of best four 32×32 distortions)]*100/(sum of best four 32×32 distortions). When the relative difference exceeds a threshold, the LCU score is increased by a first amount and, when the relative difference does not exceed the threshold, the LCU score is increased by a second amount less than the first amount. For example, if the relative difference is greater than or equal to five, the LCU score may be increased by 50% and if not, the LCU score may be increased by 25%.

In an embodiment, visually important LCUs of the problematic type include LCUs that are detected as uncovered areas. For example, whether an LCU is an uncovered area or not is intended to detect those areas that have been uncovered due to something moving in input video 111. For example, a person moving would reveal an uncovered area that was previously behind them. Such a determination as to whether an LCU is in an uncovered area may be made using any suitable technique or techniques. In an embodiment, a difference between a best motion estimation sum of absolute differences (SAD) and a best intra prediction SAD for the LCU is taken and if the best intra prediction SAD plus a threshold is less than the best motion estimation SAD, the LCU is indicated as being in an uncovered area. For example, the addition of a threshold or bias or the like to the best intra prediction SAD and the sum being less than the best motion estimation SAD may indicate the intra prediction SAD is much less than the best motion estimation SAD, which in turn indicates the LCU is in an uncovered area because no accurate motion estimation compensation may be found. For example, the best motion estimation SAD may be the SAD corresponding to the best motion estimation mode as determined by SS motion estimation module 501 and the best intra prediction SAD may be the SAD corresponding to the best intra mode as determined by SS intra search module 502. In such contexts, the LCU score is increased. The LCU score may be increased by any suitable amount when the LCU is detected as being in an uncovered area. In an embodiment, the modified LCU score is set to the maximum LCU score in the picture.

In an embodiment, visually important LCUs that may mask video quality artifacts include LCUs that are complex and such that the complexity may mask visual quality artifacts. A determination as to whether an LCU has complexity that will mask visual quality artifacts may be made using any suitable technique or techniques. In an embodiment, a variance and a non-moving average value or index are determined for the LCU. If both are greater than respective thresholds, the LCU is detected as a complex LCU. For example, the non-moving average value or index may be an average of the SAD for LCUs from any number of previous pictures that are collocated with the LCU. For example, the average of the SAD for collocated LCUs across a number of pictures may indicate the complexity of the LCU. The variance and the average of the SAD may be compared to respective thresholds and if both exceed their respective thresholds, the LCU is detected to be an LCU having complexity that will mask visual quality artifacts. In such contexts, the LCU score is decreased. The LCU score may be decreased by any suitable amount when the LCU is detected to have complexity that will mask visual quality artifacts. In an embodiment, the modified LCU score is the original score reduced by half the difference between the original LCU score and the minimum LCU score in the picture.

In an embodiment, visually important LCUs include LCUs that are very bright or very dark LCUs. A determination as to whether an LCU is very bright or very dark may be made using any suitable technique or techniques. In an embodiment, an average or median luminance of the LCU is compared to a bright LCU threshold. If the average or median luminance exceeds the bright LCU threshold, the LCU is deemed to be a bright LCU. Similarly, the average or median luminance may be compared to a dark LCU threshold and, if the average or median luminance of the LCU does not exceed the dark LCU threshold, the LCU is deemed to be a bright LCU. In such contexts, the LCU score is decreased. The LCU score may be decreased by any suitable amount when the LCU is detected to have complexity that will mask visual quality artifacts. In an embodiment, the modified LCU score is the original score reduced by half the difference between the original LCU score and the minimum LCU score in the picture.

Furthermore, at operation 604, after assigning each LCU a score, LCU score outliers may optionally be removed prior to subsequent processing. In an embodiment, a range (i.e., extending from a minimum to a maximum LCU score for the picture) of the LCU scores is divided into multiple sub-ranges. Any number of sub-ranges, such as 10 sub-ranges, dividing the range in any manner, such as into equally sized sub-ranges, may be used. Then, each of the LCUs is assigned to a corresponding sub-range using the score of the LCU. That is, the score of each LCU is used to assign the LCU to a sub-range. For example, a histogram of LCU scores may be generated based on the multiple sub-ranges or bins of the range. Subsequently, any sub-range that is at an extremity of the sub-ranges and has fewer than a threshold, such as 2%, of the LCUs is cleared. The range is then modified to extend between remaining LCU scores. Those LCUs that were in a cleared sub-range are assigned a new score from the closest available remaining sub-range. Thereby, outlier LCU scores are removed and a new score range of the picture (excluding such outliers) is generated. Such techniques may provide for improved assignment of algorithms as such outlier LCU scores are not allowed to warp the algorithm selection results.

As discussed, operation 604 optionally modifies inter LCU scores, outlier LCU scores as needed, and a range of LCU scores for the picture.

Processing continues at operation 605, where an optimal distribution of LCU costs is generated for the picture. As will be appreciated, at operation 602, a target budget for the picture was set and, at operation 604, LCU scores for each LCU of the picture were determined. Operation 605 provides for a partitioning and coding mode decision algorithm for each LCU of the picture (using the subset of M algorithms or the full set of N algorithms) that is a closest match to the target budget for the picture and allocates partitioning and coding mode decision algorithm costs efficiently across the LCUs.

Figure 7:
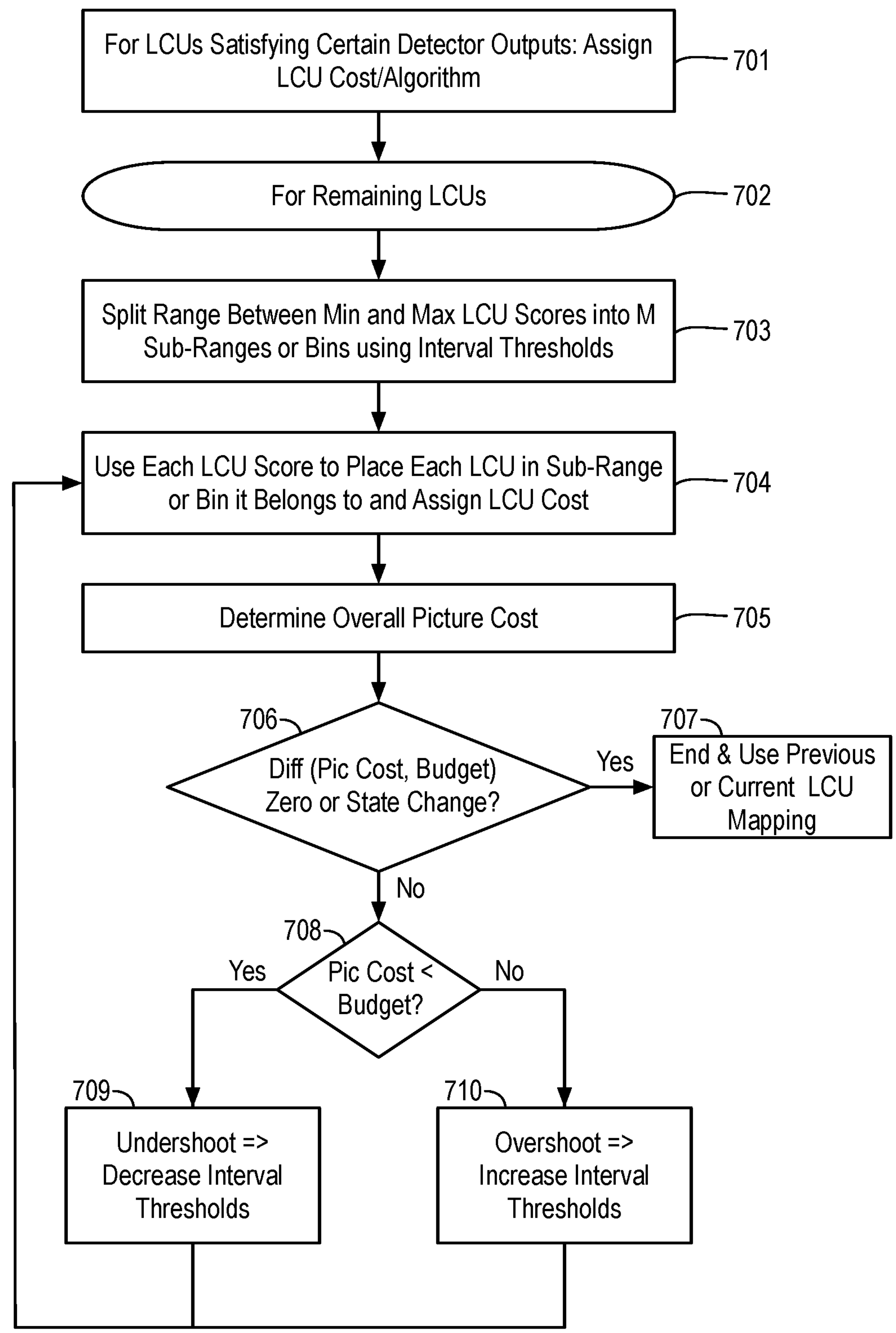
FIG. 7 is a flow diagram illustrating an example process for determining an optimal distribution of partitioning and coding mode decision algorithm costs.

FIG. 7 is a flow diagram illustrating an example process implemented, for example, at operation 605 for determining an optimal distribution of partitioning and coding mode decision algorithm costs, arranged in accordance with at least some implementations of the present disclosure. The process may include one or more operations 701-710 as illustrated in FIG. 7 and the process may be performed by a system (e.g., system 100 as discussed herein) to determine an optimal distribution of partitioning and coding mode decision algorithm costs for video encoding.

Processing may begin at operation 701, where, for LCUs satisfying certain detector outputs, the LCUs are assigned particular LCU costs/algorithms. For example, as discussed further below, setting a particular LCU cost is tantamount to selecting the algorithm as such costs will later by translated to algorithms for implementation at operation 606. At operation 701, if an LCU meets particular conditions that make it desirable to use a particular partitioning and coding mode decision algorithm, the LCU is assigned the cost corresponding to that partitioning and coding mode decision algorithm. For example, if open loop prediction with refinement (mode 3) is desirable for the LCU, a cost of 110 may assigned to the LCU such that, when cost is translated to algorithm, open loop prediction with refinement (mode 3) is assigned to the LCU.

The detector to corresponding partitioning and coding mode decision algorithm mapping may include any suitable mappings. In an embodiment, when an LCU is indicated as a sharp edge LCU, a potential aura LCU, a potential grass LCU, a potential logo LCU, or a potential blockiness LCU, the partitioning and coding mode decision algorithm for the LCU is selected as AVC equivalent (mode 6) and the cost for the LCU is set to 138. Such detectors or indicators (e.g., sharp edge LCU, potential aura LCU, potential grass LCU, potential logo LCU, or potential blockiness LCU) may be generated using any suitable technique or techniques. In an embodiment, a sharp edge LCU indicator is generated when the LCU has high variance as indicated by the LCU containing more than a particular number, such as four, very low variance blocks, such as 16×16 blocks. In an embodiment, an aura LCU indicator is generated when a motion estimation distortion for the LCU is greater than a first threshold, the best candidate motion vector has a magnitude that is greater than a second threshold, and at least one spatially adjacent LCU or CU has a motion estimation distortion that is greater than a third threshold. In an embodiment, a logo LCU indicator is generated by detecting edges within the region and determining the edges are substantially stationary across pictures of input video.

In addition, operation 701 may include an optional procedure for assigning LCUs with particular LCU costs/algorithms that prioritizes LCUs. In an embodiment, operation 701 includes assigning a number of refinement algorithms. For example, each LCU is tested based on detector(s) such that, if a detector or detectors indicates assignment of a particular algorithm, that algorithm is assigned to the LCU. In an embodiment, detector(s) and corresponding algorithm assignments are ordered in terms of importance of the LCU types being detected such that the highest importance refinement detector(s) and corresponding algorithm assignments are tested for first. The algorithms may be ordered using any suitable technique or techniques such as based on algorithm cost (with highest cost being most important) or a visual importance ranking or the like. For example, the highest priority detector(s) and corresponding algorithm assignments are tested for and assigned at a first iteration.

After such assignments, the total cost for the assigned LCUs and that of the non-assigned LCUs, assuming the latter are assigned the least costly algorithm, is determined and compared to the picture budget set at operation 602. If the total cost is less than the picture budget set, processing continues at a next iteration. If not, processing stops and the highest priority detector(s) and corresponding algorithm assignments tested for are unassigned. At a second iteration (if applicable), second highest priority detector(s) and corresponding algorithm assignments are tested for and assigned. After such assignments, the total cost for the assigned LCUs (now assigned at two iterations) is determined and compared to the picture budget. If the total cost exceeds the picture budget, the second highest priority detector(s) and corresponding algorithm assignments are unassigned. If not, processing continues at a next iteration, and so on, until all detector(s) and corresponding algorithm assignments are tested for and assigned, if possible, within the target picture budget. Such pre-processing assigns highest priority LCUs first while ensuring the picture budget is not exceeded prior to assigning non-priority LCUs. Although discussed with respect to using the entirety of the picture budget set at operation 602, any suitable budget may be used such as half the picture budgeter, three-quarters of the picture budget, or the like.

At operation 701, particular LCUs may be set with particular algorithms/algorithm costs. In subsequent processing, the algorithms/algorithm costs are not changed but the algorithm costs are used in calculating the picture costs at various iterations (if needed) as discussed below. For example, the picture cost for a particular distribution of algorithms/algorithm costs includes the costs for those algorithms/algorithm costs for LCUs set at operation 701.

Processing continues at operation 702, for remaining LCUs (e.g., those not assigned algorithms/algorithm costs at operation 701) as follows. At operation 703, the range of LCU scores is split into sub-ranges or bins such that the number of sub-ranges or bins equals the number of available partitioning and coding mode decision algorithms (i.e., M algorithms). The range of LCU scores may be split into sub-ranges using any suitable technique or techniques. In an embodiment, percentage based sub-range thresholds may be set. For example, based on the minimum and maximum LCU scores, the current picture has LCUs with LCU scores values ranging from the minimum to the maximum LCU score (e.g., Range_Scores=Max_LCU_Score−Min_LCU_Score). The LCU scores range may then be divided into sub-ranges using thresholds that define boundaries between the sub-ranges such that the number of sub-ranges is the same as the number of partitioning and coding mode decision techniques (i.e., M). The thresholds may be selected using any suitable technique or techniques. In an embodiment, percentage based sub-range thresholds are set by dividing 100% into sub-ranges according to the number of partitioning and coding mode decision techniques. For example, percentage based sub-range thresholds may be set at $i*(100/M)$ %, $i=1, \ldots, M-1$. For an illustrative example of M=3, percentage based sub-range thresholds may be set at 33.3% and 66.6%. Then, the range may be multiplied by each sub-range threshold to define sub-ranges or bins. Additional percentage based sub-range thresholds are provided in Table 2.

Figure 8:
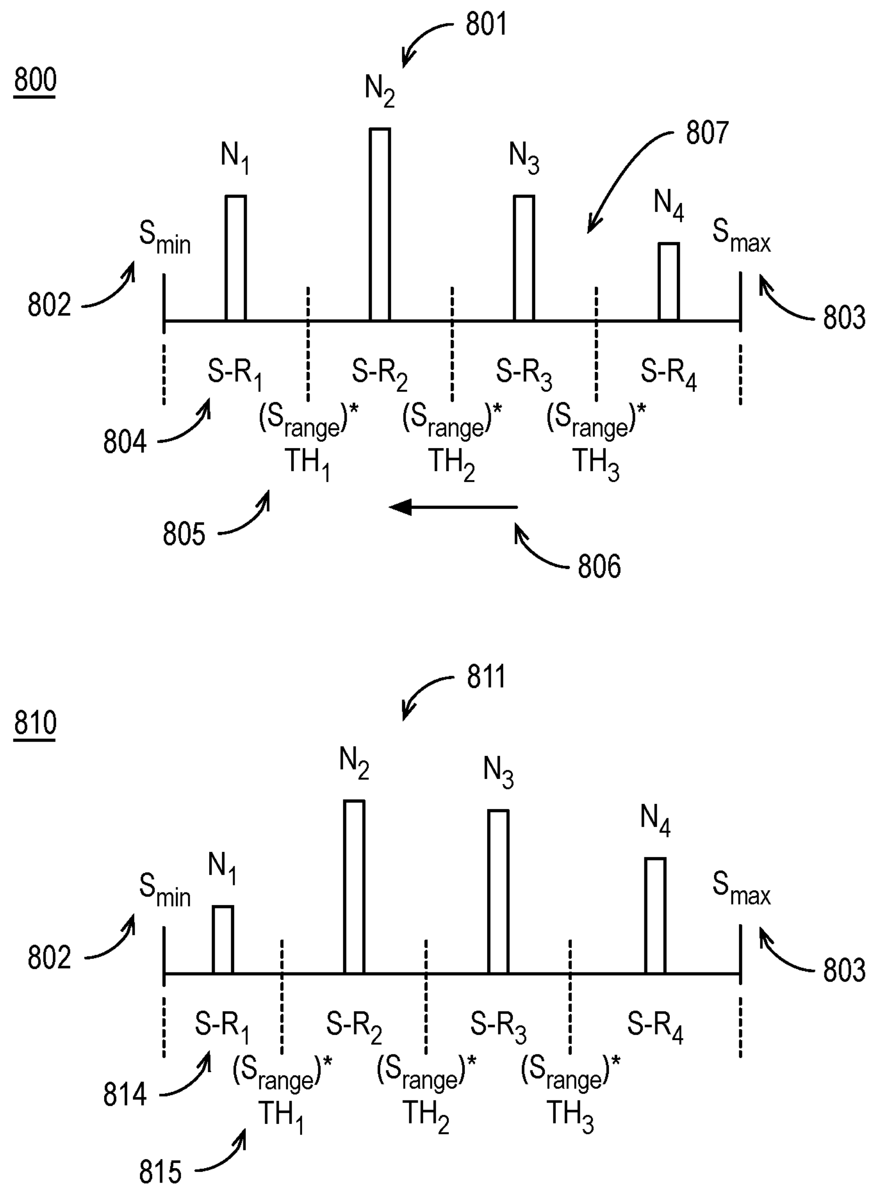
FIG. 8 illustrates example data structures for selecting partitioning and coding mode decision algorithms.

FIG. 8 illustrates example data structures 800, 810 for selecting partitioning and coding mode decision algorithms, arranged in accordance with at least some implementations of the present disclosure. Data structures 800, 810 may be implemented using any suitable technique or techniques. As shown in FIG. 8, an encode complexity range 807 for a current picture as defined by a minimum LCU score (Smin) 802 and a maximum LCU score (Smax) 803 may be divided or segmented into multiple sub-ranges 804 by thresholds 805 such that each of sub-ranges 804 includes continuous increasing values of possible LCU scores from, for a first sub-range, Smin to a first threshold (TH1) times the LCU score range (Srange=Smax−Smin), for a second sub-range, from the first threshold (TH1) times the LCU score range to second threshold (TH2) times the LCU score range, for a third sub-range, from second threshold (TH2) times the e LCU score range to third threshold (TH3) times the LCU score range, and, for a fourth sub-range, from third threshold (TH3) times the LCU score range to Smax. Although illustrated with four sub-ranges, LCU score range 807 may be segmented into any number of sub-ranges 804.

Returning to FIG. 7, processing continues at operation 704, where each LCU is placed in a sub-range defined at operation 703 using the LCU score of the LCU. Each LCU may be placed in corresponding sub-ranges using any suitable technique or techniques such as histogram techniques or the like. For example, the LCU score of the LCU may be evaluated to determine which sub-range the LCU score falls into and the LCU may be placed into the corresponding sub-range based on the evaluation.

With reference to FIG. 8, as shown with respect to data structure 800, after all LCUs have been processed (e.g., placed in corresponding sub-ranges), a particular number of LCUs 801 may be allocated to or correspond to each of sub-ranges 804. For example, for each of sub-ranges 804 (labeled S-Ri) a corresponding number of LCUs (labeled Ni) are provided within the corresponding sub-range.

As discussed with respect to operation 701, particular LCUs may be set with particular algorithms/algorithm costs. Also as discussed, in some embodiments, LCUs are assigned with particular LCU costs/algorithms that prioritize LCUs such that, if a picture budget is exceeded such LCU costs/algorithms are unassigned from the LCUs. In such embodiments, after assigning LCU costs as discussed at operation 704, an optional refinement may be applied as follows. For those LCUs that were unassigned particular algorithms/algorithm costs, a comparison is made between the cost determined at operation 704 and the cost of the unassigned algorithm. If the cost determined at operation 704 exceeds the cost of the unassigned algorithm, the cost of the unassigned algorithm is re-assigned to the LCU (e.g., assuming detector conditions have been met). After such re-assignment, an overall picture cost is determined as discussed with respect to operation 705 and compared to the picture budget as discussed with respect to 706.

In an embodiment, such techniques are applied such that the re-assigned costs are prioritized based on LCUs such that those LCUs with the highest importance refinement detector (s) and corresponding algorithm assignments are re-assigned first. As discussed herein, the algorithms may be ordered using any suitable technique or techniques such as based on algorithm cost (with highest cost being most important) or a visual importance ranking or the like. In an embodiment, the highest priority algorithm costs are reassigned at a first iteration and the process is repeated until all algorithm costs are reassigned.

Returning to FIG. 7, processing continues at operation 705, where an overall pictures cost is determined based on the sub-range allocation generated at operation 704. For example, as discussed, each sub-range corresponds to a particular partitioning and coding mode decision algorithm. For example, the sub-ranges correspond to increasingly costly partitioning and coding mode decision algorithms. To generate the overall picture cost, the cost of each LCU assigned at operation 701 and operation 704 may be summed. With reference to FIG. 8, based on the illustrated allocation, an estimated cost for performing partitioning and coding mode decision for the current picture for those LCUs not assigned at operation 701 may be determined as a sum of the cost for each sub-range (C_i) times the number of LCUs in each sub range (N_i) (e.g., Estimated_Cost=C_1*N_1+C_i*N_i+C_M*N_M). The total estimated cost for performing partitioning and coding mode decision for the current picture is then the discussed sum and the sum of the costs of those LCUs allocated at operation 701. For example, if sub-ranges 1 to 4 are modes open loop prediction (mode 1, cost of 100), open loop prediction with light refinement (mode 2, cost of 106), open loop prediction with refinement (mode 3, cost of 110), and light binary depth partitioning (BDP) (mode 4, cost of 123), the total picture cost would be the sum of the cost for those LCUs not assigned at operation 701, 100*N1, 106*N2, 110*N3, and 123*N4.

Returning to FIG. 7, processing continues at decision operation 706, where a determination is made as to whether the difference between the estimated cost (Pic Cost, as provided by operation 705) of the current picture and the target budget (as provided by operation 602) differ by zero (or have a difference that does not exceed in magnitude a threshold) or whether the difference had a state change. A state change occurs when the difference changes sign or when an estimated cost was previously higher than the target budget but is now lower or vice versa as iterations of operations 704-710 are performed. For example, when the estimated cost was previously higher than the target budget but is now lower, the estimated cost has come within the budget and modifications (discussed further herein with respect to operations 709, 710) are no longer required. The current LCU to sub-range assignments and corresponding partitioning and coding mode decision algorithm cost allocation for each LCU may be used at operation 707.

Similarly, when the estimated cost was previously less than the target budget but is now higher, the estimated cost has gone just beyond the budget and modifications (discussed further herein with respect to operations 709, 710) are no longer required. In such cases, the previous iteration LCU to sub-range assignments and corresponding partitioning and coding mode decision algorithm cost allocation for each LCU may be used at operation 707. Furthermore, when the difference is zero or less than a threshold in magnitude, the current LCU to sub-range assignments and corresponding partitioning and coding mode decision algorithm cost allocation for each LCU may be used at operation 707.

If none of the above conditions hold true, processing continues at decision operation 708, where a determination is made as to whether the estimated cost of the picture is less than the target budget. If so, processing continues at operation 709, where an undershoot has been observed and intervals are shifted left (i.e., thresholds between sub-ranges are decreased). For example, percentage based thresholds determined at operation 703 may be adjusted to alter boundaries between sub-ranges for allocating LCUs to sub-range based on LCU score. By reducing such percentage based thresholds (and thereby the thresholds between sub-ranges), in a next allocation iteration, fewer LCUs will be allocated to bins with lower complexity partitioning and coding mode decision algorithms and more LCUs will be allocated to bins with higher complexity partitioning and coding mode decision algorithms. Thereby, the estimated cost of partitioning and coding mode decision for the picture will increase (at subsequent operations) and bring the estimated cost closer toward the target.

If the estimated cost of the picture is not less than the target budget, processing continues at operation 710, where an overshoot has been observed and intervals are shifted right (i.e., thresholds between sub-ranges are increased). For example, the percentage based thresholds determined at operation 803 may be adjusted to adjust boundaries between sub-ranges for allocating LCUs to sub-range based on LCU score. By increasing such percentage based thresholds (and thereby the thresholds between sub-ranges), in a next allocation iteration, more LCUs will be allocated to bins with lower complexity partitioning and coding mode decision algorithms and fewer LCUs will be allocated to bins with higher complexity partitioning and coding mode decision algorithms. Thereby, the estimated cost of partitioning and coding mode decision for the picture will increase (at subsequent operations) and bring the estimated cost closer toward the target.

As shown, after operation 709 or operation 710 has been performed, processing continues at operation 704 for processing as discussed above. As will be appreciated, based on the modifications of the percentage based thresholds and/or thresholds between sub-ranges or bins, the allocation of LCUs (based on LCU score) to such sub-ranges or bins changes with respect to previous iterations.

With reference to FIG. 8, as shown with respect to threshold shift 806 from data structure 800 to data structure 810, thresholds 805 are shifted left (i.e., decreased) to generate new thresholds 815. In an embodiment, thresholds 805 are reduced by decrementing percentage based thresholds (e.g., TH1, TH2, TH3) by a predetermined amount (e.g., 1, 2, 3, etc.) and thresholds 815 are determined as the percentage based thresholds multiplied by the distortion range as discussed above. However, thresholds 805 may be reduced using any suitable technique or techniques such as multiplying them by a reduction factor or the like to generate thresholds 815.

After all LCUs have been processed (at a second iteration or subsequent iteration as discussed with respect to FIG. 7), a particular number of LCUs 811 are allocated to or correspond to each of sub-ranges 814 defined by thresholds 815. For example, for each of sub-ranges 814 (labeled S-Ri), a corresponding number of LCUs (labeled Ni) are provided within the corresponding sub-range. As shown, due to the size of sub-range S-R1 being reduced, the number of LCUs N1 in sub-range S-R1 has also reduced. Similarly, the shift of thresholds between thresholds 805 and thresholds 815 has reduced the number of LCUs N2 in sub-range S-R2 and increased the number of LCUs N3 in sub-range S-R3 and the number of LCUs N4 in in sub-range S-RN.

Although illustrated with respect to a decrease in threshold values as discussed with respect to operation 709, threshold values may be increased as discussed with respect to operation 710. Furthermore, the allocation of LCUs to sub-ranges is merely illustrative and any suitable LCU allocation may arise based on the threshold adjustments. As discussed above, based on allocation illustrated with respect to data structure 810, an updated estimated cost for performing partitioning and coding mode decision for the current picture may be determined, for the current iteration, as a sum of the costs of those LCUs allocated at operation 701 and a sum of the cost for each sub-range (C_i) times the number of LCUs in each sub range (N_i) as discussed with respect to operation 705.

Returning to FIG. 7, such processing including allocating LCUs to sub-ranges, determining an estimated cost for the picture, adjusting thresholds, and so on may be repeated any number of times until convergence as discussed with respect to operations 706. Furthermore, as discussed with respect to operation 707, the LCU allocation is then used for partitioning and coding mode decision such that on an LCU-by-LCU basis, partitioning and coding mode decision for each LCU is performed based on the partitioning and coding mode decision technique assigned to the sub-range to which the LCU was assigned.

Returning now to FIG. 6, processing continues at operation 606 from operation 707, where each LCU is assigned a partitioning and coding mode decision algorithm corresponding to the cost corresponding to the LCU determined at operation 605 (and as provided in detail in FIG. 7). For example, a look up table or the like may be used to translate from cost for an LCU to partitioning and coding mode decision algorithm. Processing continues at operation 607, where the output of LCU-by-LCU partitioning and coding mode decision algorithm selection is provided as output. For example, the output of LCU-by-LCU partitioning and coding mode decision algorithm selection may be provided as partitioning and coding mode decision algorithm 514.

As discussed, on an LCU-by-LCU basis, a partitioning and coding mode decision algorithm may be selected from multiple partitioning and coding mode decision algorithms. As discussed, any number and types of partitioning and coding mode decision algorithms may be implemented. In an embodiment, the partitioning and coding mode decision algorithms include one or more of open loop prediction, open loop prediction with light refinement, open loop prediction with refinement, light binary depth partitioning (BDP), full binary depth partitioning (BDP), advanced video coding (AVC) equivalent, and full search. Discussion now turns to example partitioning and coding mode decision techniques.

In full search or exhaustive search (e.g., mode 7), for each LCU, partitioning of the LCU includes evaluating all partitioning options available based on the coding standard being applied. For example, in quad-tree type partitioning, exhaustive search tests all available depths (e.g., from 64×64 to 8×8 or from 64×64 to 4×4) and selects the depth with the best partition according to a cost measure. Furthermore, in exhaustive search, for each partition (e.g., CU) of the LCU, inter modes are evaluated and intra modes are evaluated. For example, for inter modes List0, List1 and bi-prediction (bi-pred) may be evaluated as provided by motion estimation candidates 511. For intra modes, all intra modes may be evaluated or a limited set of intra modes may be evaluated as provided by intra candidates 512 plus additional candidate intra modes as provided by most probable mode generation techniques. As discussed, full search may be a highest computation cost partitioning and coding mode search technique.

In open-loop prediction (e.g., any of open loop prediction (mode 1), open loop prediction with light refinement (mode 2), and open loop prediction with refinement (mode 3)), pre-analysis data are used to determine partitioning options to test. In open loop prediction (mode 1), only one predicted partitioning is tested. The predicted partitioning is generated based on the open-loop ME (e.g., motion estimation candidates 511) and open-loop intra search (OIS) data (intra candidates 512) as well as open-loop rate estimates to decide on a best partitioning option. Open loop prediction with light refinement (mode 2) tests the predicted partitioning as in the OLP algorithm plus one or more additional partitioning options around the predicted partitioning. For example, open loop prediction with light refinement may be slower as compared to open loop prediction, but may yield fewer visual quality artifacts. Open loop prediction with refinement (mode 3) is similar to open loop prediction with light refinement but tests additional partitioning options around the predicted partitioning. Again, open loop prediction with refinement is expected to be slower as compared to open loop prediction with light refinement, but may mitigate more potential VQ artifacts. For example, open loop prediction tests modes for only a predicted partitioning of an LCU such that the predicted partitioning is based only on original pixel data (e.g., no reconstructed pixel data is used). Open loop prediction with light refinement tests the predicted partitioning and a first number of additional partitionings and open loop prediction with refinement tests the predicted partitioning and a second number of additional partitionings such that the second number is greater than the first number. In an embodiment, the second additional partitionings includes all of the first additional partitionings plus additional options. In any such examples, mode decisions are evaluated for the available partitionings and the corresponding best coding modes and best partitioning of the LCU is used for coding.

In advanced video coding equivalent (e.g., AVC equivalent (mode 6)), only 16×16 and 8×8 coding units of the LCU are tested. As discussed herein, advanced video coding equivalent may be used only when specific detector conditions are satisfied. For example, the detector(s) may detect visually important areas such as logo areas, etc. The advanced video coding equivalent algorithm is a high quality mode for the corresponding LCU as it ensures that the appropriate partition sizes are used. In such advanced video coding equivalent examples, mode decisions are evaluated for the available partitionings and the corresponding best coding modes and best partitioning of the LCU is used for coding.

Full binary depth partitioning (BDP) (mode 5) will now be discussed with respect to FIG. 9. As will be appreciated, exhaustive search may provide a highest computational complexity search technique (with corresponding likelihood of highest visual quality) and open-loop prediction and refinement may provide a lowest computational complexity search technique (with corresponding likelihood of highest visual quality). Binary depth partitioning may provide a middle ground (e.g., a computational complexity search technique with a computational complexity between that of exhaustive search and open-loop prediction and refinement).

Figure 9:
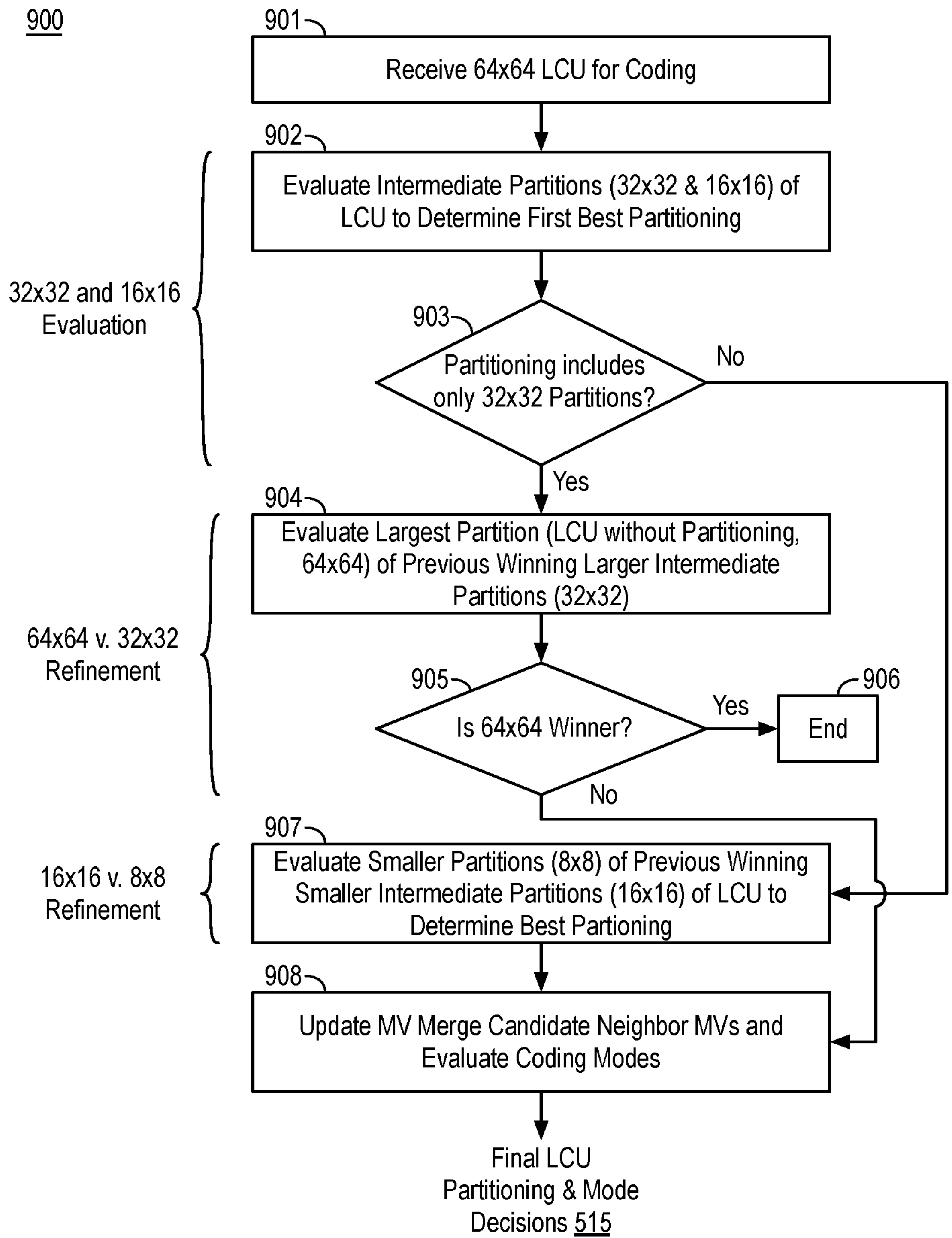
FIG. 9 is a flow diagram illustrating an example process for performing partitioning and coding mode decision using binary depth partitioning.

FIG. 9 is a flow diagram illustrating an example process 900 for performing partitioning and coding mode decision using binary depth partitioning, arranged in accordance with at least some implementations of the present disclosure. Process 900 may include one or more operations 901-908 as illustrated in FIG. 9. Process 900 may be performed by a system (e.g., system 100 as discussed herein) to perform partitioning and coding mode decision using binary depth partitioning. In an embodiment, process 900 is implemented by one of PCMD algorithm modules 506, 507, 508.

Process 900 provides for performing partitioning and coding mode decision using binary depth partitioning (BDP). In BDP, the partitioning and coding mode decision are determined in a process that may involve several stages such that processing may end at a given stage if the partitioning results from that stage are satisfactory according to pre-specified criteria. BDP is discussed herein with respect to quad-tree partitioning. However, BDP may be extended to any partitioning scheme. Furthermore, process 900 is discussed with respect to partitioning a 64×64 LCU. However, process 900 may be used to partition any size block.

Process 900 begins at operation 901, where an LCU is received for processing. For example, the LCU may be 64×64 pixels and the LCU may be processed according to BDP based on selecting BDP from multiple partitioning and coding mode decision techniques as discussed herein. Processing continues at operation 902, where intermediate partitions of the LCU are evaluated to generate a first best partitioning of the LCU. In the given example, the LCU is 64×64 and quad-tree partitioning is being implemented such that first stage of BDP evaluates two partitions: 32×32 and 16×16 partitions. However, operation 902 may evaluate any number of multiple partitions such that the evaluated partitions are smaller than the size of the LCU (e.g., do not include evaluation of the LCU itself) and larger than a minimum partition size of the LCU (e.g., 4×4 or the like). The determination of the first best partitioning of the LCU using intermediate partition sizes only may be performed using any suitable technique or techniques such as coding cost evaluations using available inter modes and intra modes for each of the CUs being evaluated.

Processing continues at decision operation 903, where a determination is made as to whether the partitioning of the LCU generated at operation 902 (e.g., the first best partitioning) uses only the largest of the intermediate partitions evaluated. In the illustrated example, the intermediate partitions evaluated at operation 1102 included 32×32 and 16×16 partitions. In such an example, a determination is made at operation 903 as to whether the first best partitioning of the current LCU includes only 32×32 partitions (i.e., the largest partitions of the intermediate partitions evaluated). For example, operations 902, 903 may provide a first stage in BDP (e.g., 32×32 and 16×16 evaluation) that includes testing 32×32 blocks and 16×16 blocks of the block or LCU and deciding on the best partitioning that would involve only those two CU sizes. If the resulting partitioning includes all 32×32 CUs, then processing continues at a second stage (e.g., 64×64 v. 32×32 refinement) and, otherwise (i.e., if the resulting partitioning involves a mix of 32×32 and 16×16 CUs or only 16×16 CUs), processing continues at a third stage (e.g., 16×16 v. 8×8 refinement) as discussed further below.

If the partitioning of the LCU generated at operation 902 includes only the largest of the intermediate partitions evaluated, processing continues at operation 904, where the largest partition of the LCU is evaluated. In the illustrated example, the largest partition of the LCU (e.g., the LCU without partitioning) is 64×64. The evaluation of the largest partition of the LCU may be performed using any suitable technique or techniques such as determining a best coding mode for the largest partition of the LCU using available inter modes and intra modes.

Processing continues at decision operation 905, where a determination is made as to whether the largest partition of the LCU (e.g., the LCU without partitioning at 64×64) provides a lower coding cost than the partitioning of the LCU using only 32×32 partitioning. If so, processing ends at operation 906 and the LCU without partitioning at 64×64 (e.g., a 64×64 partitioning or CU) of the LCU is selected (along with the best inter or intra mode) for coding the LCU. Furthermore, indicators of the partitioning and the best inter or intra mode are added to final LCU partitioning and mode decisions data 515. Using such techniques, computational costs are reduced by eliminating of evaluation smaller partitions of the LCU such as 8×8 partitions in the case of intermediate partitions evaluation leading to largest of the intermediate partitions only. For example, a second stage of BDP may include evaluating the LCU partitioned into 32×32 CUs only versus a 64×64 CU and determining which of the two is the winner based on coding cost. The winning partitioning is then considered the final partitioning for the LCU. If not, processing continues at operation 908 as is discussed further herein below.

If the partitioning of the LCU generated at operation 902 includes a mix of intermediate partitions including other than the largest partition (e.g., partitions including at least one 16×16 partition), processing continues at operation 907, where the smallest of the intermediate partitions that belong to the first best partitioning are further partitioned and evaluated. In the given example, the LCU is 64×64 and quad-tree partitioning is being implemented such that first stage of BDP evaluates two partitions: 32×32 and 16×16 partitions. In such contexts, evaluation at operation 907 includes evaluation of the 16×16 partitions of the first best partitioning by further partitioning the 16×16 partitions into 8×8 partitions and comparing, for each individual 16×16 partition, the cost of coding the 8×8 partitions to the cost of coding the 16×16 partition. The comparison for such 16×16 partitions with further 8×8 partitions may be performed using any suitable technique or techniques such as coding cost evaluations using available inter modes and intra modes for each of the CUs (partitions) being evaluated. For example, for the case where the selected partitioning from Stage 1 involves a mix of 32×32 and 16×16 CUs (or only 16×16 CUs), each of the 16×16 CUs is tested individually against 8×8 CUs, and the resulting partitioning is used and indicated in final LCU partitioning and mode decisions data 515. Furthermore, the resulting partitioning is evaluated at the next stage (BDP merge pass) as provided by operation 908.

Processing continues from decision operation 905 or operation 907 at operation 908, where motion vector (MV) merge candidate neighbor motion vectors are updated and coding modes may be further evaluated. For example, operation 908 provides a BDP merge pass such that for CUs where the coding mode is MV merge are re-evaluated to determine the best coding mode. Such processing is needed because neighboring block information may have changed from the time the MV merge mode decision was made for some CUs. Such re-evaluation of MV merge CUs may be performed using any suitable technique or techniques. In an embodiment, such re-evaluation includes considering both inter and intra candidates for such CUs. Such processing does not change the LCU partitioning but may change coding modes of re-evaluated CUs and such changes are provided in final LCU partitioning and mode decisions data 515.

As discussed, process 900 illustrates an exemplary full binary depth partitioning (BDP) (mode 5). Light binary depth partitioning (BDP) (mode 4) may be the same as full binary depth partitioning (BDP) (mode 5) except that testing of 8×8 blocks is performed at operation 907 only if 16×16 intra blocks are selected. If 16×16 inter blocks are selected, 8×8 blocks are not tested.

Although discussed with respect to 64×64, 32×32, 16×16, and 8×8 partitions (e.g., 4 depths of partitioning), process 900 may be extended to any suitable partitions of any number of partitioning depths. For example, BDP may be extended to 6 depths (e.g., 128×128, 64×64, 32×32, 16×16, 8×8, 4×4) as follows. Start with the evaluation of coding modes for 32×32 vs. 16×16 partitions. If the first best partitioning is all 32×32 partitions, then proceed to 64×64 vs. 32×32 partitioning evaluation. If the second best partitioning is a mix of 64×64 and 32×32 partitions or is all 32×32 partitions, then stop and select the second best partitioning. Otherwise, proceed with 128×128 vs. 64×64 partitioning evaluation and select the best partitioning for the individual coding block. If the first best partitioning is a mix of 32×32 and 16×16 partitions, then individually test each of the 16×16 partitions in the first best partitioning vs. 8×8 partitioning. If the winner in 16×16 vs. 8×8 partitioning is the 8×8 partitioning, then each of the 8×8 partitions is compared to 4×4 partitioning to develop the final partitioning for each 16×16 partition in the first best partitioning, and consequently the final partitioning for the individual coding block.

Figure 10:
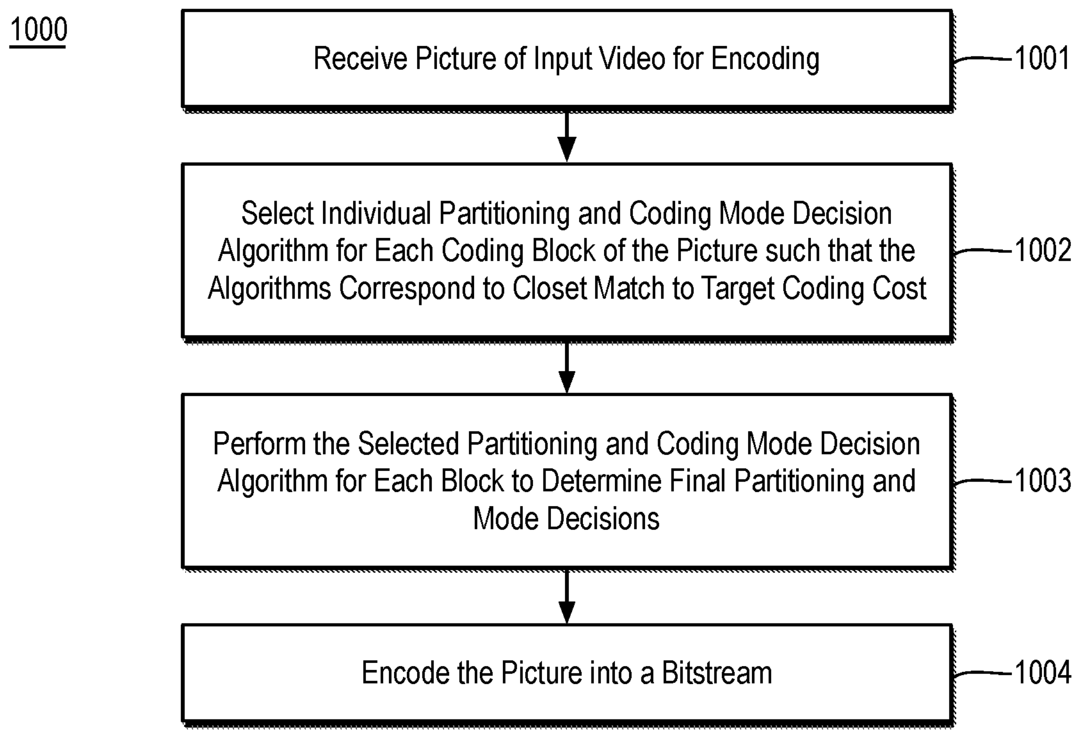
FIG. 10 is a flow diagram illustrating an example process for video encoding.

FIG. 10 is a flow diagram illustrating an example process 1000 for video encoding, arranged in accordance with at least some implementations of the present disclosure. Process 1000 may include one or more operations 1001-1004 as illustrated in FIG. 10. Process 1000 may form at least part of a video coding process. By way of non-limiting example, process 1000 may form at least part of a video coding process as performed by any device or system as discussed herein such as system 100. Furthermore, process 1000 will be described herein with reference to system 1100 of FIG. 11.

Figure 11:
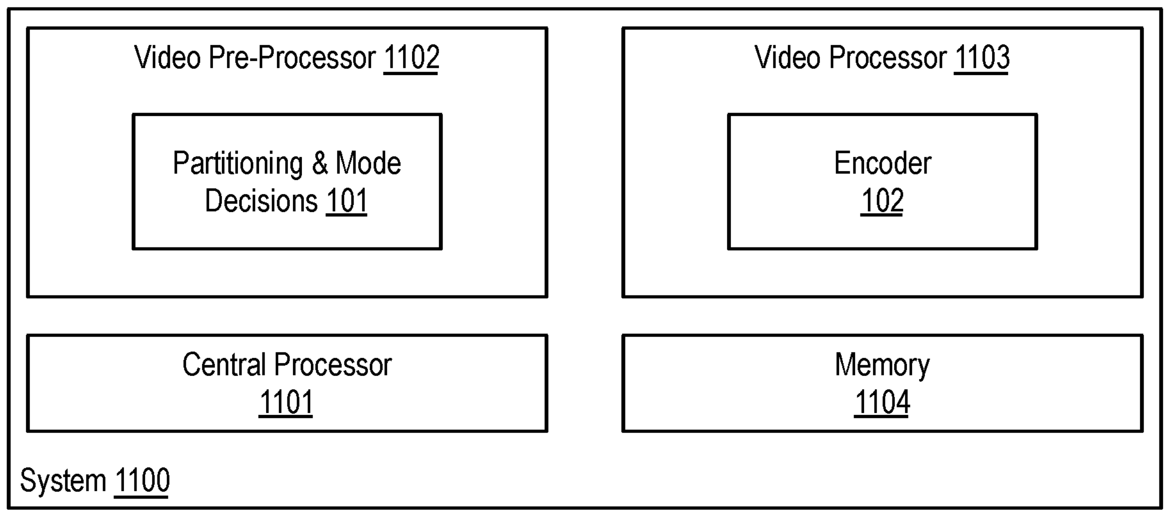
FIG. 11 is an illustrative diagram of an example system for video encoding.

FIG. 11 is an illustrative diagram of an example system 1100 for video encoding, arranged in accordance with at least some implementations of the present disclosure. As shown in FIG. 11, system 1100 may include a central processor 1101, a video pre-processor 1102, a video processor 1103, and a memory 1104. Also as shown, video pre-processor 1102 may include or implement partitioning and mode decisions module 101 and video pre-processor 1102 may include or implement encoder 102. In the example of system 1100, memory 1104 may store video data or related content such as input video data, picture data, partitioning data, modes data, and/or any other data as discussed herein.

As shown, in some embodiments, partitioning and mode decisions module 101 is implemented via video pre-processor 1102. In other embodiments, partitioning and mode decisions module 101 or portions thereof are implemented via central processor 1101 or another processing unit such as an image processor, a graphics processor, or the like. Also as shown, in some embodiments, encoder 102 is implemented via video processor 1103. In other embodiments, encoder 102 or portions thereof are implemented via central processor 1101 or another processing unit such as an image processor, a graphics processor, or the like.

Video pre-processor 1102 may include any number and type of video, image, or graphics processing units that may provide the operations as discussed herein. Such operations may be implemented via software or hardware or a combination thereof. For example, video pre-processor 1102 may include circuitry dedicated to manipulate pictures, picture data, or the like obtained from memory 1104. Similarly, video processor 1103 may include any number and type of video, image, or graphics processing units that may provide the operations as discussed herein. Such operations may be implemented via software or hardware or a combination thereof. For example, video processor 1103 may include circuitry dedicated to manipulate pictures, picture data, or the like obtained from memory 1104. Central processor 1101 may include any number and type of processing units or modules that may provide control and other high level functions for system 1100 and/or provide any operations as discussed herein. Memory 1104 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1104 may be implemented by cache memory.

In an embodiment, one or more or portions of partitioning and mode decisions module 101 or encoder 102 are implemented via an execution unit (EU). The EU may include, for example, programmable logic or circuitry such as a logic core or cores that may provide a wide array of programmable logic functions. In an embodiment, one or more or portions of partitioning and mode decisions module 101 or encoder 102 are implemented via dedicated hardware such as fixed function circuitry or the like. Fixed function circuitry may include dedicated logic or circuitry and may provide a set of fixed function entry points that may map to the dedicated logic for a fixed purpose or function. In an embodiment, partitioning and mode decisions module 101 is implemented via field programmable grid array (FPGA).

Returning to discussion of FIG. 10, process 1000 may begin at operation 1001, where a picture of input video is received for encoding. The picture of input video may be any suitable picture or frame in any suitable format. Processing continues at operation 1002, where, for each of a plurality of coding blocks of the picture, a partitioning and coding mode decision algorithm is selected from a plurality of partitioning and coding mode decision algorithms such that the selected partitioning and coding mode decision algorithms correspond to a closest picture cost match to a target cost for the picture. The partitioning and coding mode decision algorithms for the plurality of coding blocks may be selected using any suitable technique or techniques.

In an embodiment, prior to selecting a partitioning and coding mode decision algorithm for each block, the plurality of partitioning and coding mode decision algorithms may be determined as a subset of a second plurality of partitioning and coding mode decision algorithms. For example, the plurality of partitioning and coding mode decision algorithms may be determined as a subset of a second plurality of partitioning and coding mode decision algorithms based on the one or more detectors such that the one or more detectors include at least one of a coding mode of the input video, a temporal layer of the picture, or an indicator of whether or not the picture is a visually important picture.

In an embodiment, selecting an individual partitioning and coding mode decision algorithm for an individual coding block of the plurality of coding blocks includes determining a score of the individual coding block is within a particular sub-range of a score range of the picture and assigning the individual partitioning and coding mode decision algorithm to the individual coding block in response to the score of the individual block being within the particular sub-range. The score of the individual coding block may be determined using any suitable technique or techniques. In an embodiment, the score of the individual coding block is based on at least one of a variance of the individual coding block, a motion estimation or intra prediction distortion of the individual coding block, whether the individual coding block includes an edge, or a likelihood of the individual coding block having a visual artifact. In an embodiment, the scores for particular blocks may be modified. For example, process 1000 may include generating a score for each of the plurality of coding blocks, determining, based on one or more detectors, that a first coding block of the plurality of coding blocks is a visually important coding block, and modifying, in response to the first coding block being visually important, a first score corresponding to the first coding block. In an embodiment, the one or more detectors include an indicator the first coding block is in an uncovered area of the picture and modifying the first score includes increasing the first score corresponding to the first coding block. In an embodiment, the one or more detectors include an indicator the first coding block is a complex coding block and modifying the first score includes decreasing the first score corresponding to the first coding block.

In an embodiment, selecting the partitioning and coding mode decision algorithms includes dividing a score range of the picture into a plurality of sub-ranges using initial thresholds that define boundaries between the sub-ranges such that each of the sub-ranges corresponds to one of the plurality of partitioning and coding mode decision algorithms, assigning coding blocks of the picture to corresponding sub-ranges based on a score of each coding block being within a sub-range, determining a cost for the picture based on the coding block assignment to corresponding sub-ranges, and adjusting the plurality of sub-ranges based on adjusted thresholds in response to a comparison of the cost and the target cost for the picture. In an embodiment, selecting the partitioning and coding mode decision algorithms may include determining a first coding block of the plurality of coding blocks satisfies a detector condition based on the one or more detectors and assigning a particular partitioning and coding mode decision algorithm corresponding to the detector condition to the first coding block, wherein the first coding block is not assigned to one of the sub-ranges in response to the first coding block being assigned the particular partitioning and coding mode decision algorithm.

As discussed, the selected partitioning and coding mode decision algorithms correspond to a closest picture cost match to a target cost for the picture. The target cost for the picture may be determined using any suitable technique or techniques. In an embodiment, process 1000 includes determining the target cost for the picture based on one or more of a coding mode of the input video, a resolution of the picture, a temporal layer of the picture, or an indicator of whether or not the picture is a visually important picture such that the target cost for the picture decreases with decreasing quality of coding mode, increasing resolution of the picture, increasing temporal layer of the picture, and the picture not being a visually important picture.

The discussed plurality of partitioning and coding mode decision algorithms may include any number and any types of algorithms. In an embodiment, the plurality of partitioning and coding mode decision algorithms includes at least an exhaustive search algorithm, an open loop prediction algorithm that uses only original pixel samples, and a binary depth partitioning algorithm that limits partitioning depth evaluation. In an embodiment, applying the binary depth partitioning algorithm includes evaluating coding modes for first and second intermediate partitionings of the individual coding block to generate a first best partitioning such that the first intermediate partitioning includes at least a first level partitioning of the individual coding block and the second intermediate partitioning is one partitioning level beyond the first level partitioning to provide smaller partitions than the first level partitioning and evaluating, in response to the first best partitioning including only the first intermediate partitioning of the individual coding block, coding modes for the individual coding block without partitioning or with a third partitioning such that the first level partitioning is one partitioning level beyond the third partitioning to provide smaller partitions than the third partitioning. Furthermore, the binary depth partitioning algorithm may include evaluating, in response to the first best partitioning including at least one second intermediate partitioning of the individual coding block, coding modes for a fourth partitioning of the least one second intermediate partitioning such that the fourth level partitioning is one partitioning level beyond the second intermediate partitioning to provide smaller partitions than the second level partitioning.

Processing continues at operation 1003, where the selected partitioning and coding mode algorithm for each block is performed to determine final partitioning and mode decisions for the blocks, and at operation 1004, where the picture is encoded using the final partitioning and mode decisions into a bitstream.

Process 1000 may be repeated any number of times either in series or in parallel for any number input video sequences, pictures, coding units, blocks, etc. As discussed, process 1000 may provide for video encoding generating coding mode decisions using only original pixel samples or values such that the coding mode decisions are implemented by an encoder such as a standards compliant encoder. For example, process 1000 includes encoding the picture using the selected partitioning and coding mode decision algorithm for each coding block to generate a portion of a bitstream such as a standards compliant bitstream.

The techniques herein provide an approach to select, at the LCU level, a partitioning and coding mode decision algorithm from among a set of such algorithms. The algorithms may be part of a mode decision process in an encoder where at least initial decisions on partitioning and coding modes for the resulting partitions are made. For example, different LCUs may use partitioning and coding mode decision algorithms with different levels of complexity to maintain a given level of quality for a picture. The selection mechanism may take as input a set of partitioning and coding mode decision algorithms, LCU scores, multiple detector outputs and a computational cost/LCU for each of the algorithms. The LCU scores are used along with other detector data to classify LCUs. The detector outputs are used to identify visually important areas in the picture. The computational cost/LCU for each of the algorithms along with the detector outputs are used to set a target computational cost for the whole picture. The techniques assign to each LCU a partitioning and coding mode decision algorithm in such that the cost associated with all the assigned algorithms in the picture is closest to the target computational cost for the whole picture. The assignment of different algorithms to different LCUs provides an improved trade-off between complexity and video quality with less computational complexity.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
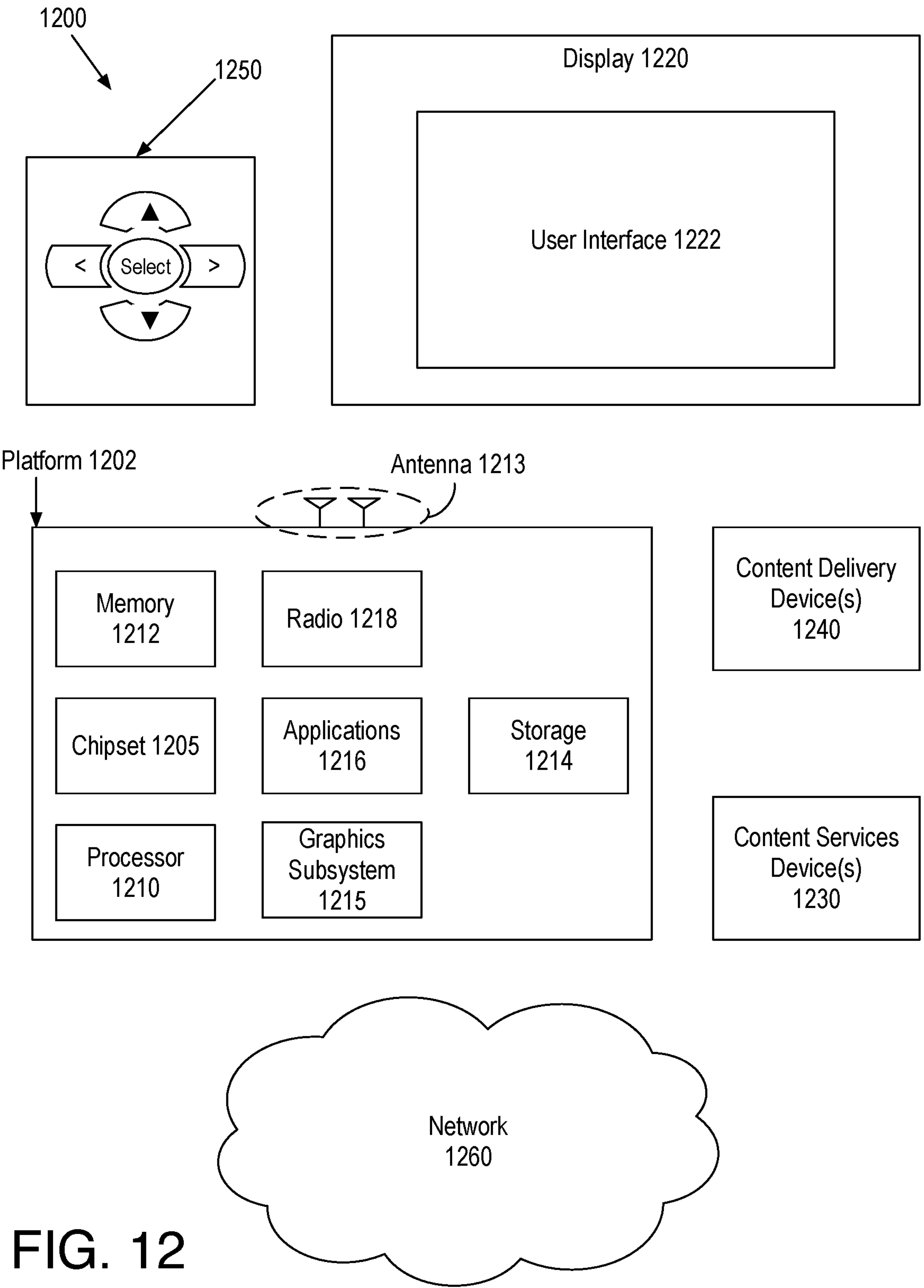
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of may be used to interact with user interface 1222, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1220) by movements of a pointer, cursor, focus ring, or other visual indicators displayed on the display. For example, under the control of software applications 1216, the navigation features located on navigation may be mapped to virtual navigation features displayed on user interface 1222, for example. In various embodiments, may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
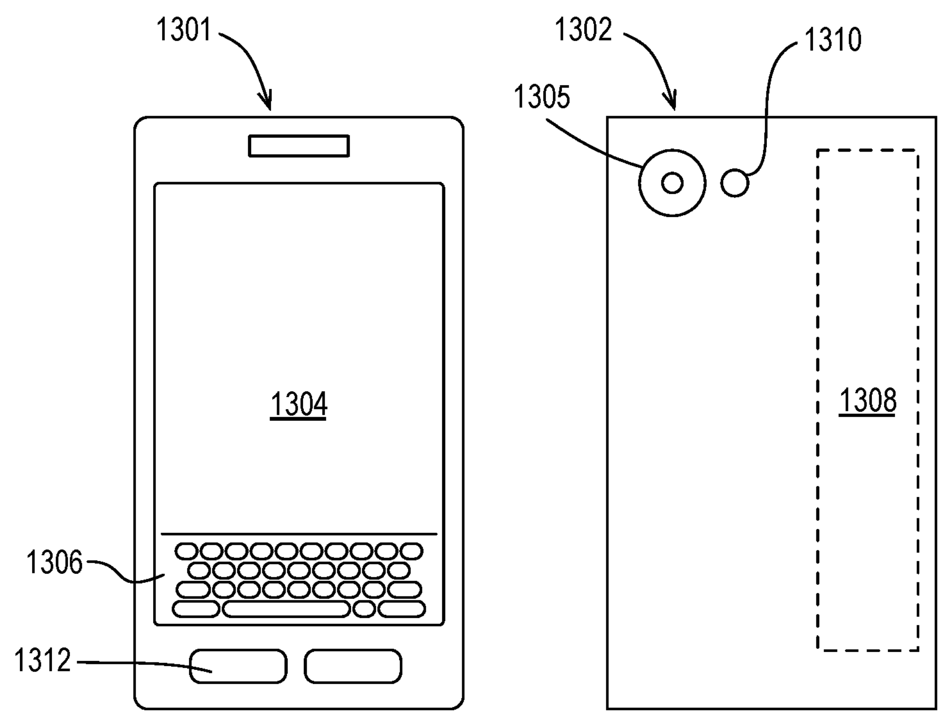
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, system 100 or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video encoding comprises receiving a picture of input video for encoding, selecting, for each of a plurality of coding blocks of the picture, a partitioning and coding mode decision algorithm from a plurality of partitioning and coding mode decision algorithms, such that the selected partitioning and coding mode decision algorithms correspond to a closest picture cost match to a target cost for the picture, and encoding the picture using the selected partitioning and coding mode decision algorithm for each coding block to generate a portion of a bitstream.

In one or more second embodiments, for any of the first embodiments, selecting an individual partitioning and coding mode decision algorithm for an individual coding block of the plurality of coding blocks comprises determining a score of the individual coding block is within a particular sub-range of a score range of the picture and assigning the individual partitioning and coding mode decision algorithm to the individual coding block in response to the score of the individual block being within the particular sub-range.

In one or more third embodiments, for any of the first or second embodiments, the score of the individual coding block is based on at least one of a variance of the individual coding block, a motion estimation or intra prediction distortion of the individual coding block, whether the individual coding block includes an edge, or a likelihood of the individual coding block having a visual artifact.

In one or more fourth embodiments, for any of the first through third embodiments, the method further comprises generating a score for each of the plurality of coding blocks, determining, based on one or more detectors, that a first coding block of the plurality of coding blocks is a visually important coding block, and modifying, in response to the first coding block being visually important, a first score corresponding to the first coding block.

In one or more fifth embodiments, for any of the first through fourth embodiments, the one or more detectors comprises an indicator the first coding block is in an uncovered area of the picture and modifying the first score comprises increasing the first score corresponding to the first coding block.

In one or more sixth embodiments, for any of the first through fifth embodiments, the one or more detectors comprises an indicator the first coding block is a complex coding block and modifying the first score comprises decreasing the first score corresponding to the first coding block.

In one or more seventh embodiments, for any of the first through sixth embodiments, selecting the partitioning and coding mode decision algorithms comprises dividing a score range of the picture into a plurality of sub-ranges using initial thresholds that define boundaries between the sub-ranges, such that each of the sub-ranges corresponds to one of the plurality of partitioning and coding mode decision algorithms, assigning coding blocks of the picture to corresponding sub-ranges based on a score of each coding block being within a sub-range, determining a cost for the picture based on the coding block assignment to corresponding sub-ranges, and adjusting the plurality of sub-ranges based on adjusted thresholds in response to a comparison of the cost and the target cost for the picture.

In one or more eighth embodiments, for any of the first through seventh embodiments, selecting the partitioning and coding mode decision algorithms comprises determining a first coding block of the plurality of coding blocks satisfies a detector condition based on the one or more detectors and assigning a particular partitioning and coding mode decision algorithm corresponding to the detector condition to the first coding block, such that the first coding block is not assigned to one of the sub-ranges in response to the first coding block being assigned the particular partitioning and coding mode decision algorithm.

In one or more ninth embodiments, for any of the first through eighth embodiments, the method further comprises determining the target cost for the picture based on one or more of a coding mode of the input video, a resolution of the picture, a temporal layer of the picture, or an indicator of whether or not the picture is a visually important picture, such that the target cost for the picture decreases with decreasing quality of coding mode, increasing resolution of the picture, increasing temporal layer of the picture, and the picture not being a visually important picture.

In one or more tenth embodiments, for any of the first through ninth embodiments, the method further comprises determining the plurality of partitioning and coding mode decision algorithms as a subset of a second plurality of partitioning and coding mode decision algorithms based on the one or more detectors, such that the one or more detectors comprise at least one of a coding mode of the input video, a temporal layer of the picture, or an indicator of whether or not the picture is a visually important picture.

In one or more eleventh embodiments, for any of the first through tenth embodiments, the plurality of partitioning and coding mode decision algorithms comprises at least an exhaustive search algorithm, an open loop prediction algorithm that uses only original pixel samples, and a binary depth partitioning algorithm that limits partitioning depth evaluation.

In one or more twelfth embodiments, for any of the first through eleventh embodiments, the method further comprise applying an individual partitioning and coding mode decision algorithm for an individual coding block by evaluating coding modes for first and second intermediate partitionings of the individual coding block to generate a first best partitioning, such that the first intermediate partitioning comprises at least a first level partitioning of the individual coding block and the second intermediate partitioning is one partitioning level beyond the first level partitioning to provide smaller partitions than the first level partitioning and evaluating, in response to the first best partitioning including only the first intermediate partitioning of the individual coding block, coding modes for the individual coding block without partitioning or with a third partitioning, such that the first level partitioning is one partitioning level beyond the third partitioning to provide smaller partitions than the third partitioning.

In one or more thirteenth embodiments, for any of the first through twelfth embodiments, applying the individual partitioning and coding mode decision algorithm for the individual coding block further comprises evaluating, in response to the first best partitioning including at least one second intermediate partitioning of the individual coding block, coding modes for a fourth partitioning of the least one second intermediate partitioning, such that the fourth level partitioning is one partitioning level beyond the second intermediate partitioning to provide smaller partitions than the second level partitioning.

In one or more fourteenth embodiments, a system for video encoding comprises a memory to store a picture of input video for encoding and a processor coupled to the memory, the processor to select, for each of a plurality of coding blocks of the picture, a partitioning and coding mode decision algorithm from a plurality of partitioning and coding mode decision algorithms, such that the selected partitioning and coding mode decision algorithms correspond to a closest picture cost match to a target cost for the picture and encode the picture using the selected partitioning and coding mode decision algorithm for each coding block to generate a portion of a bitstream.

In one or more fifteenth embodiments, for any of the fourteenth embodiments, the processor to select an individual partitioning and coding mode decision algorithm for an individual coding block of the plurality of coding blocks comprises the processor to determine a score of the individual coding block is within a particular sub-range of a score range of the picture and assign the individual partitioning and coding mode decision algorithm to the individual coding block in response to the score of the individual block being within the particular sub-range.

In one or more sixteenth embodiments, for any of the fourteenth or fifteenth embodiments, the processor is further to generate a score for each of the plurality of coding blocks, determine, based on one or more detectors, that a first coding block of the plurality of coding blocks is a visually important coding block, and modify, in response to the first coding block being visually important, a first score corresponding to the first coding block.

In one or more seventeenth embodiments, for any of the fourteenth through sixteenth embodiments, the processor to select the partitioning and coding mode decision algorithms comprises the processor to divide a score range of the picture into a plurality of sub-ranges using initial thresholds that define boundaries between the sub-ranges, such that each of the sub-ranges corresponds to one of the plurality of partitioning and coding mode decision algorithms, assign coding blocks of the picture to corresponding sub-ranges based on a score of each coding block being within a sub-range, determine a cost for the picture based on the coding block assignment to corresponding sub-ranges, and adjust the plurality of sub-ranges based on adjusted thresholds in response to a comparison of the cost and the target cost for the picture.

In one or more eighteenth embodiments, for any of the fourteenth through seventeenth embodiments, the processor is further to determine the target cost for the picture based on one or more of a coding mode of the input video, a resolution of the picture, a temporal layer of the picture, or an indicator of whether or not the picture is a visually important picture, such that the target cost for the picture decreases with decreasing quality of coding mode, increasing resolution of the picture, increasing temporal layer of the picture, and the picture not being a visually important picture.

In one or more nineteenth embodiments, the processor is further to determine the plurality of partitioning and coding mode decision algorithms as a subset of a second plurality of partitioning and coding mode decision algorithms based on the one or more detectors, such that the one or more detectors comprise at least one of a coding mode of the input video, a temporal layer of the picture, or an indicator of whether or not the picture is a visually important picture.

In one or more twentieth embodiments, at least one machine readable medium may include a plurality of instructions that in response to being executed on a computing device, causes the computing device to perform a method according to any one of the above embodiments.

In one or more twenty-first embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video encoding comprising:

receiving a picture of input video for encoding, the picture comprising a plurality of coding blocks;

setting a target coding cost for the picture;

determining, for each of the coding blocks, a coding block complexity score, each coding block complexity score comprising one of a best intra distortion or a best motion estimation distortion for the coding block based on prediction of the coding block using only original pixel samples of the input video and without use of reconstructed pixel samples, wherein the best intra distortion for the coding block is generated using only original pixel samples of the picture and without partitioning of the coding block, and the best motion estimation distortion for the coding blocks is generated by a motion search using the coding block without partitioning of at least one other picture of the input video comprising only original pixel samples;

selecting, for each of the coding blocks, a partitioning and coding mode decision algorithm from a plurality of partitioning and coding mode decision algorithms using the coding block complexity scores, wherein each of the plurality of partitioning and coding mode decision algorithms comprises an algorithm for partitioning and mode selection of the corresponding coding block using only the original pixel samples and without use of reconstructed pixel samples, and wherein the selected partitioning and coding mode decision algorithms correspond to a closest picture cost match to the target cost for the picture;

determining a partitioning and coding modes for each of the coding blocks using the corresponding partitioning and coding mode decision algorithm for each of the coding blocks using only the original pixel samples and without use of reconstructed pixel samples; and encoding the picture using the selected partitioning and coding modes for each coding block using the original pixel samples and reconstructed pixel samples corresponding to the selected partitioning and coding modes to generate a portion of a bitstream.

2. The method of claim 1, wherein selecting an individual partitioning and coding mode decision algorithm for an individual coding block of the plurality of coding blocks comprises:

determining a coding block complexity score comprising the best intra distortion or motion estimation distortion of the individual coding block is within a particular sub-range of a coding block complexity score range of the picture, the coding block coding block complexity score range defined between minimum and maximum coding block complexity scores of the picture; and assigning the individual partitioning and coding mode decision algorithm corresponding to the sub-range to the individual coding block in response to the coding block complexity score of the individual block being within the particular sub-range.

3. The method of claim 2, wherein the coding block complexity score of the individual coding block is further based on at least one of a variance of the individual coding block, whether the individual coding block includes an edge, or a likelihood of the individual coding block having a visual artifact.

4. The method of claim 2, further comprising:

determining, based on one or more detectors, that a first coding block of the plurality of coding blocks is a visually important coding block; and modifying, prior to selecting the partitioning and coding mode decision algorithms and in response to the first coding block being visually important, a first coding block complexity score corresponding to the first coding block.

5. The method of claim 4, wherein the one or more detectors comprises an indicator the first coding block is in an uncovered area of the picture and modifying the first coding block complexity score comprises increasing the first score corresponding to the first coding block.

6. The method of claim 4, wherein the one or more detectors comprises an indicator the first coding block is a complex coding block and modifying the coding block complexity first score comprises decreasing the first coding block complexity score corresponding to the first coding block.

7. The method of claim 1, wherein selecting the partitioning and coding mode decision algorithms comprises:

dividing a distortion range of the picture, the coding distortion range defined between minimum and maximum coding block distortions of the picture, into a plurality of sub-ranges using initial thresholds that define boundaries between the sub-ranges, wherein each of the sub-ranges corresponds to one of the plurality of partitioning and coding mode decision algorithms;

assigning coding blocks of the picture to corresponding sub-ranges based on the best intra or motion estimation distortion of each coding block being within a sub-range;

determining a cost for the picture based on the coding block assignments to corresponding sub-ranges; and adjusting the plurality of sub-ranges based on adjusted thresholds in response to a comparison of the cost and the target cost for the picture.

8. The method of claim 7, wherein selecting the partitioning and coding mode decision algorithms comprises:

determining a first coding block of the plurality of coding blocks satisfies a detector condition based on one or more detectors; and assigning a first partitioning and coding mode decision algorithm of the plurality of partitioning and coding mode decision algorithms corresponding to the detector condition to the first coding block, wherein the first coding block is not assigned to one of the sub-ranges in response to the first coding block being assigned the first partitioning and coding mode decision algorithm.

9. The method of claim 1, wherein setting the target coding cost comprises determining the target cost for the picture based on one or more of a coding mode of the input video, a resolution of the picture, a temporal layer of the picture, or an indicator of whether or not the picture is a visually important picture, wherein the target cost for the picture decreases with decreasing quality of coding mode, increasing resolution of the picture, increasing temporal layer of the picture, and the picture not being a visually important picture.

10. The method of claim 1, further comprising:

determining the plurality of partitioning and coding mode decision algorithms as a subset of a second plurality of partitioning and coding mode decision algorithms based on one or more detectors, wherein the one or more detectors comprise at least one of a coding mode of the input video, a temporal layer of the picture, or an indicator of whether or not the picture is a visually important picture.

11. The method of claim 1, wherein the plurality of partitioning and coding mode decision algorithms comprises at least an exhaustive search algorithm, an open loop prediction algorithm, and a binary depth partitioning algorithm that limits partitioning depth evaluation.

12. The method of claim 1, wherein determining the partitioning and coding modes comprises applying an individual partitioning and coding mode decision algorithm for an individual coding block by:

evaluating coding modes for first and second intermediate partitionings of the individual coding block to generate a first best partitioning, wherein the first intermediate partitioning comprises at least a first level partitioning of the individual coding block and the second intermediate partitioning is one partitioning level beyond the first level partitioning to provide smaller partitions than the first level partitioning; and evaluating, in response to the first best partitioning including only the first intermediate partitioning of the individual coding block, coding modes for the individual coding block without partitioning or with a third partitioning, wherein the first level partitioning is one partitioning level beyond the third partitioning to provide smaller partitions than the third partitioning.

13. The method of claim 12, wherein applying the individual partitioning and coding mode decision algorithm for the individual coding block further comprises:

evaluating, in response to the first best partitioning including at least one second intermediate partitioning of the individual coding block, coding modes for a fourth partitioning of the least one second intermediate partitioning, wherein the fourth level partitioning is one partitioning level beyond the second intermediate partitioning to provide smaller partitions than the second level partitioning.

14. A system for video coding comprising:

a memory to store a picture of input video for encoding, the picture comprising a plurality of coding blocks; and a processor coupled to the memory, the processor to:

set a target coding cost for the picture;

determine, for each of the coding blocks, a coding block complexity score, each coding block complexity score comprising one of a best intra distortion or a best motion estimation distortion for the coding block based on prediction of the coding block using only original pixel samples of the input video and without use of reconstructed pixel samples, wherein the best intra distortion for the coding block is generated using only original pixel samples of the picture and without partitioning of the coding block, and the best motion estimation distortion for the coding blocks is generated by a motion search using the coding block without partitioning of at least one other picture of the input video comprising only original pixel samples;

select, for each of the coding blocks, a partitioning and coding mode decision algorithm from a plurality of partitioning and coding mode decision algorithms using the coding block complexity scores, wherein each of the plurality of partitioning and coding mode decision algorithms comprises an algorithm for partitioning and mode selection of the corresponding coding block using only the original pixel samples and without use of reconstructed pixel samples, and wherein the selected partitioning and coding mode decision algorithms correspond to a closest picture cost match to the target cost for the picture;

determine a partitioning and coding modes for each of the coding blocks for each of the coding blocks using the corresponding partitioning and coding mode decision algorithm using only the original pixel samples and without use of reconstructed pixel samples; and encode the picture using the selected partitioning and coding modes for each coding block using the original pixel samples and reconstructed pixel samples corresponding to the selected partitioning and coding modes to generate a portion of a bitstream.

15. The system of claim 14, wherein the processor to select an individual partitioning and coding mode decision algorithm for an individual coding block of the plurality of coding blocks comprises the processor to:

determine a coding block complexity score comprising the best intra distortion or motion estimation distortion of the individual coding block is within a particular sub-range of a coding block complexity score range of the picture, the coding block complexity score range defined between minimum and maximum coding block complexity scores of the picture; and assign the individual partitioning and coding mode decision algorithm corresponding to the sub-range to the individual coding block in response to the coding block complexity score of the individual block being within the particular sub-range.

16. The system of claim 15, wherein the processor is further to:

determine, based on one or more detectors, that a first coding block of the plurality of coding blocks is a visually important coding block; and modify, prior to selecting the partitioning and coding mode decision algorithms and in response to the first coding block being visually important, a first coding block complexity score corresponding to the first coding block.

17. The system of claim 14, wherein the processor to select the partitioning and coding mode decision algorithms comprises the processor to:

divide a distortion range of the picture, the coding block distortion range defined between minimum and maximum coding block distortions of the picture, into a plurality of sub-ranges using initial thresholds that define boundaries between the sub-ranges, wherein each of the sub-ranges corresponds to one of the plurality of partitioning and coding mode decision algorithms;

assign coding blocks of the picture to corresponding sub-ranges based on the best intra or motion estimation distortion of each coding block being within a sub-range;

determine a cost for the picture based on the coding block assignments to corresponding sub-ranges; and adjust the plurality of sub-ranges based on adjusted thresholds in response to a comparison of the cost and the target cost for the picture.

18. The system of claim 14, wherein the processor to set the target coding cost comprises the processor to determine the target cost for the picture based on one or more of a coding mode of the input video, a resolution of the picture, a temporal layer of the picture, or an indicator of whether or not the picture is a visually important picture, wherein the target cost for the picture decreases with decreasing quality of coding mode, increasing resolution of the picture, increasing temporal layer of the picture, and the picture not being a visually important picture.

19. The system of claim 14, wherein the processor is further to:

determine the plurality of partitioning and coding mode decision algorithms as a subset of a second plurality of partitioning and coding mode decision algorithms based on the one or more detectors, wherein the one or more detectors comprise at least one of a coding mode of the input video, a temporal layer of the picture, or an indicator of whether or not the picture is a visually important picture.

20. At least one non-transitory machine readable medium comprising a plurality of instructions that, in response to being executed on a computing device, cause the computing device to perform video coding by:

receiving a picture of input video for encoding, the picture comprising a plurality of coding blocks;

setting a target coding cost for the picture;

determining, for each of the coding blocks, a coding block complexity score, each coding block complexity score comprising one of a best intra distortion or a best motion estimation distortion for the coding block based on prediction of the coding block using only original pixel samples of the input video and without use of reconstructed pixel samples, wherein the best intra distortion for the coding block is generated using only original pixel samples of the picture and without partitioning of the coding block, and the best motion estimation distortion for the coding blocks is generated by a motion search using the coding block without partitioning of at least one other picture of the input video comprising only original pixel samples;

selecting, for each of the coding blocks, a partitioning and coding mode decision algorithm from a plurality of partitioning and coding mode decision algorithms using the coding block complexity scores, wherein each of the plurality of partitioning and coding mode decision algorithms comprises an algorithm for partitioning and mode selection of the corresponding coding block using only the original pixel samples and without use of reconstructed pixel samples, and wherein the selected partitioning and coding mode decision algorithms correspond to a closest picture cost match to the target cost for the picture;

determining a partitioning and coding modes for each of the coding blocks using the corresponding partitioning and coding mode decision algorithm for each of the coding blocks using only the original pixel samples and without use of reconstructed pixel samples; and encoding the picture using the selected partitioning and coding modes for each coding block using the original pixel samples and reconstructed pixel samples corresponding to the selected partitioning and coding modes to generate a portion of a bitstream.

21. The non-transitory machine readable medium of claim 20, wherein selecting an individual partitioning and coding mode decision algorithm for an individual coding block of the plurality of coding blocks comprises:

determining a coding block complexity score comprising the best intra distortion or motion estimation distortion of the individual coding block is within a particular sub-range of a coding block complexity score range of the picture, the coding block coding block complexity score range defined between minimum and maximum coding block complexity scores of the picture; and assigning the individual partitioning and coding mode decision algorithm corresponding to the sub-range to the individual coding block in response to the coding block complexity score of the individual block being within the particular sub-range.

22. The non-transitory machine readable medium of claim 21, wherein the machine readable medium comprises further instructions that, in response to being executed on the computing device, cause the computing device to perform video coding by:

determining, based on one or more detectors, that a first coding block of the plurality of coding blocks is a visually important coding block; and modifying, prior to selecting the partitioning and coding mode decision algorithms and in response to the first coding block being visually important, a first coding block complexity score corresponding to the first coding block.

23. The non-transitory machine readable medium of claim 20, wherein selecting the partitioning and coding mode decision algorithms comprises:

dividing a distortion range of the picture, the coding block distortion range defined between minimum and maximum coding block distortions of the picture, into a plurality of sub-ranges using initial thresholds that define boundaries between the sub-ranges, wherein each of the sub-ranges corresponds to one of the plurality of partitioning and coding mode decision algorithms;

assigning coding blocks of the picture to corresponding sub-ranges based on the best intra or motion estimation distortion of each coding block being within a sub-range;

determining a cost for the picture based on the coding block assignments to corresponding sub-ranges; and adjusting the plurality of sub-ranges based on adjusted thresholds in response to a comparison of the cost and the target cost for the picture.

24. The non-transitory machine readable medium of claim 20, wherein setting the target coding cost comprises determining the target cost for the picture based on one or more of a coding mode of the input video, a resolution of the picture, a temporal layer of the picture, or an indicator of whether or not the picture is a visually important picture, wherein the target cost for the picture decreases with decreasing quality of coding mode, increasing resolution of the picture, increasing temporal layer of the picture, and the picture not being a visually important picture.

25. The non-transitory machine readable medium of claim 19, wherein the machine readable medium comprises further instructions that, in response to being executed on the computing device, cause the computing device to perform video coding by:

determining the plurality of partitioning and coding mode decision algorithms as a subset of a second plurality of partitioning and coding mode decision algorithms based on the one or more detectors, wherein the one or more detectors comprise at least one of a coding mode of the input video, a temporal layer of the picture, or an indicator of whether or not the picture is a visually important picture.

* * * * *